(12) United States Patent
Eisenmann et al.

(10) Patent No.: US 10,944,573 B1
(45) Date of Patent: Mar. 9, 2021

(54) DETERMINING RELATIVE POSITIONS AND TRUSTING DATA BASED ON LOCALLY SENSED EVENTS

(71) Applicant: Amazon Technologies, Inc., Seattle, WA (US)

(72) Inventors: Shmuel Eisenmann, Seattle, WA (US); Gur Kimchi, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 143 days.

(21) Appl. No.: 15/860,589

(22) Filed: Jan. 2, 2018

(51) Int. Cl.
| *H04L 9/32* | (2006.01) |
| *G06F 21/44* | (2013.01) |
| *G05D 1/02* | (2020.01) |
| *G08G 5/04* | (2006.01) |
| *G06K 9/62* | (2006.01) |
| *G08G 5/00* | (2006.01) |

(52) U.S. Cl.
CPC ......... *H04L 9/3247* (2013.01); *G05D 1/0255* (2013.01); *G06F 21/44* (2013.01); *G06K 9/6215* (2013.01); *G08G 5/045* (2013.01); *G05D 1/0276* (2013.01); *G08G 5/0008* (2013.01); *G08G 5/0021* (2013.01); *G08G 5/0069* (2013.01)

(58) Field of Classification Search
CPC .... H04L 9/3247; G08G 5/045; G08G 5/0069; G08G 5/0021; G08G 5/0008; G05D 1/0255; G05D 1/0276; G06F 21/44; G06K 9/6215
See application file for complete search history.

(56) References Cited

U.S. PATENT DOCUMENTS

| 5,596,332 | A | 1/1997 | Coles et al. | |
| 6,665,631 | B2 | 12/2003 | Steinbrecher | |
| 7,511,662 | B2 | 3/2009 | Mathews et al. | |
| 9,442,496 | B1* | 9/2016 | Beckman | G06N 20/00 |
| 2009/0118875 | A1 | 5/2009 | Stroud | |
| 2010/0142448 | A1 | 6/2010 | Schlicht et al. | |
| 2016/0171896 | A1* | 6/2016 | Buchmueller | G08G 5/0008 701/3 |
| 2016/0247407 | A1* | 8/2016 | Paczan | G08G 5/045 |
| 2016/0370263 | A1* | 12/2016 | Duesterhoft | B64C 39/024 |
| 2017/0006417 | A1* | 1/2017 | Canoy | H04L 63/126 |
| 2017/0031369 | A1* | 2/2017 | Liu | G06K 9/0063 |
| 2017/0176188 | A1 | 6/2017 | Georgy et al. | |
| 2017/0234966 | A1* | 8/2017 | Naguib | G01S 5/22 367/117 |

(Continued)

*Primary Examiner* — Huan V Doan
(74) *Attorney, Agent, or Firm* — Athorus, PLLC

(57) ABSTRACT

Devices or systems such as aerial vehicles may determine that they are located within a common locality based on data captured during an event, such as the emission of light, sound or other matter or energy. Where sensors associated with such devices or systems are each determined to have captured data associated with the event, the devices or systems may be determined to have been located within a common locality during the event. The locality may be defined with respect to the data or the devices or systems, e.g., a range associated with the data or the event, on any basis. A relative distance between the devices or systems may be determined based on the data captured during the event. Additionally, where two or more devices or systems are determined to have been located within a common locality, data exchanged therebetween may be trusted by each of such devices or systems.

20 Claims, 25 Drawing Sheets

(56) References Cited

U.S. PATENT DOCUMENTS

| | | |
|---|---|---|
| 2018/0074520 A1 | 3/2018 | Liu et al. |
| 2018/0173246 A1 | 6/2018 | Crockett et al. |
| 2019/0035288 A1* | 1/2019 | Beltman ................ B64D 47/06 |

* cited by examiner

ACOUSTIC SIGNAL CAPTURED AT TIME $t_1$

MESSAGE REPORTING CAPTURE OF ACOUSTIC SIGNAL TRANSMITTED

ACOUSTIC SIGNAL CAPTURED AT TIME $t_2$

MESSAGE REPORTING CAPTURE OF ACOUSTIC SIGNAL BY UAV 110A
RECEIVED BY UAV 110B

UAV 110A REPORTS OPERATING CONDITIONS IN LOCALITY

UAV 110B TRUSTS MESSAGE BASED ON CONFIRMED
PRESENCE OF UAV 110A WITHIN LOCALITY

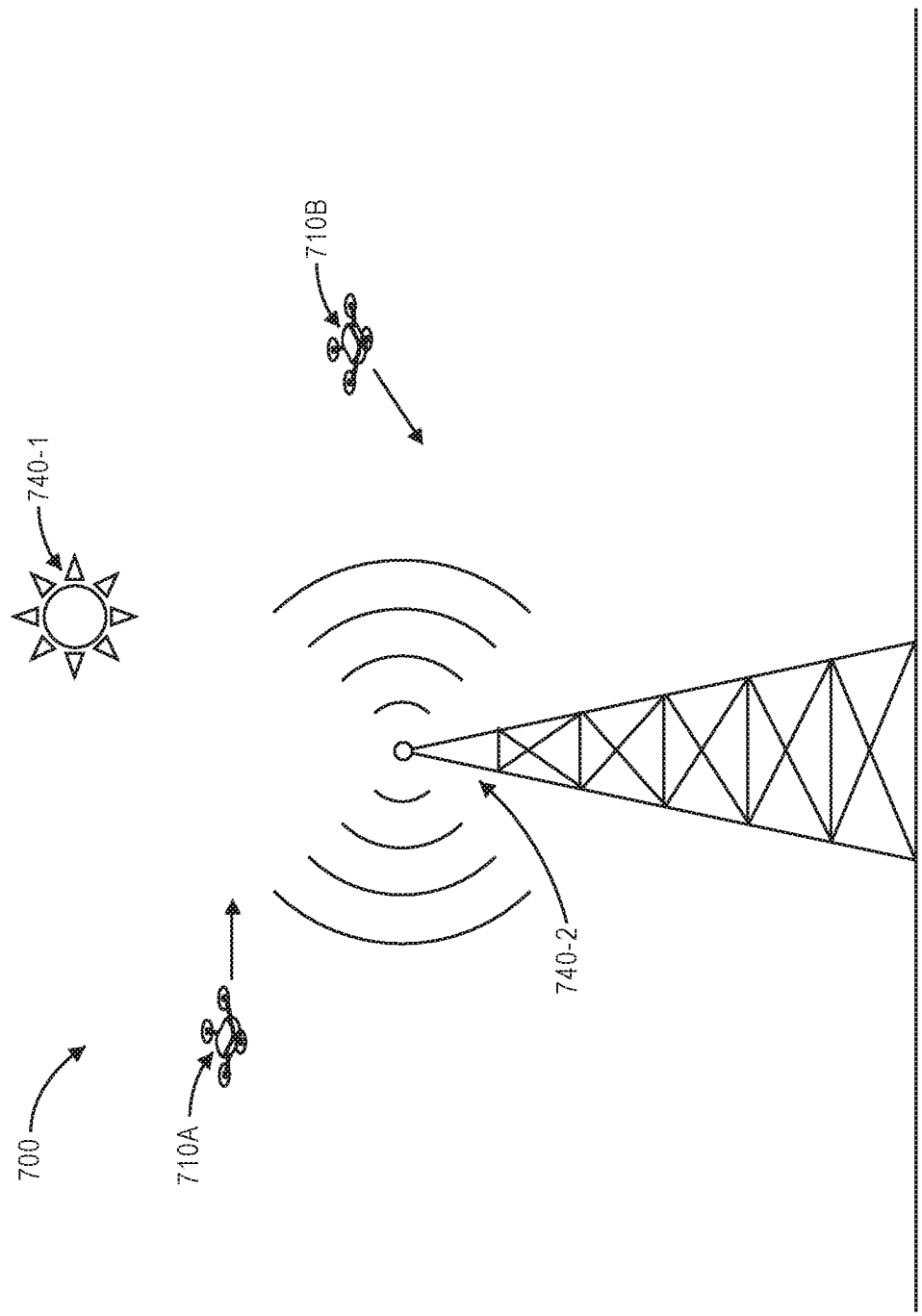

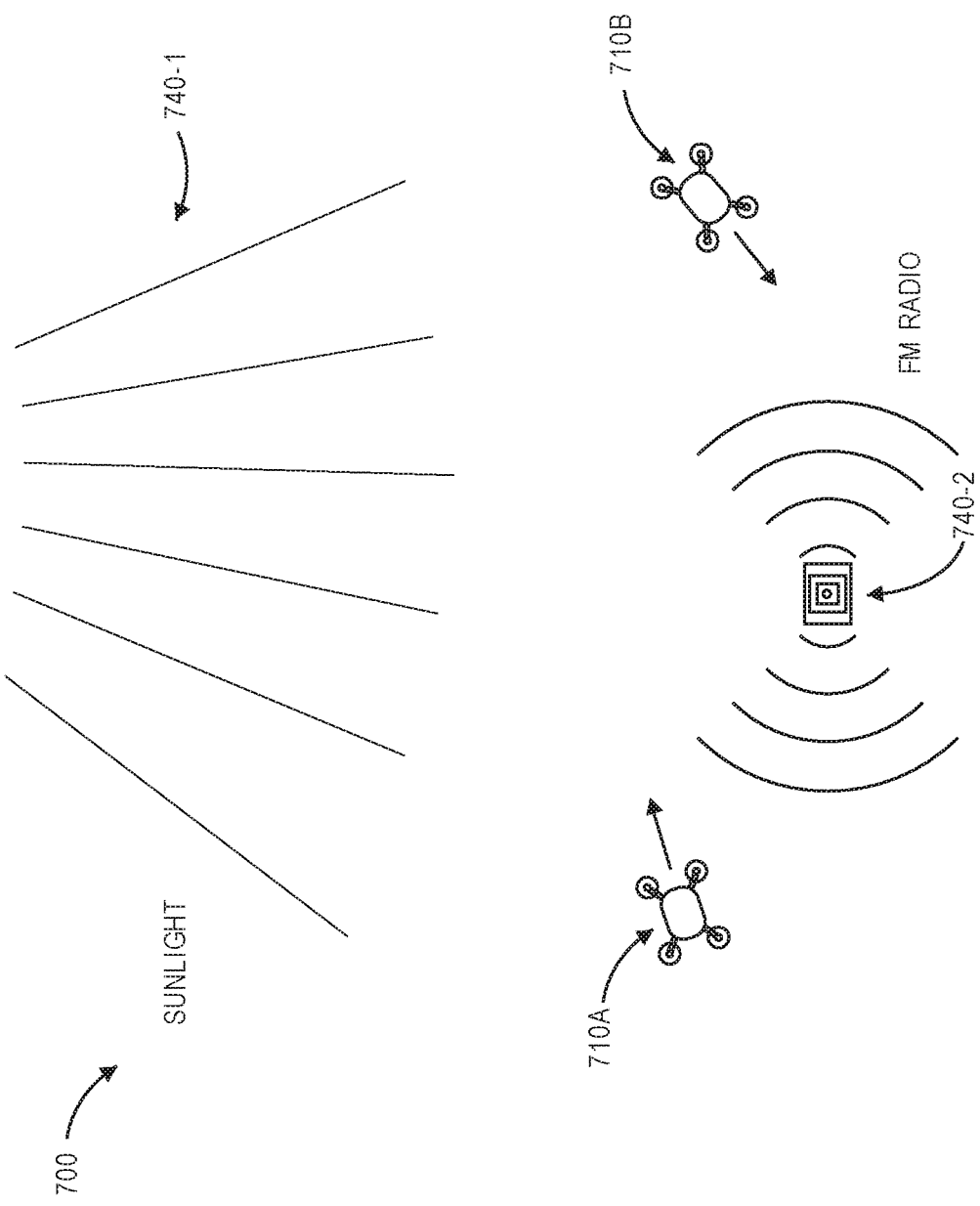

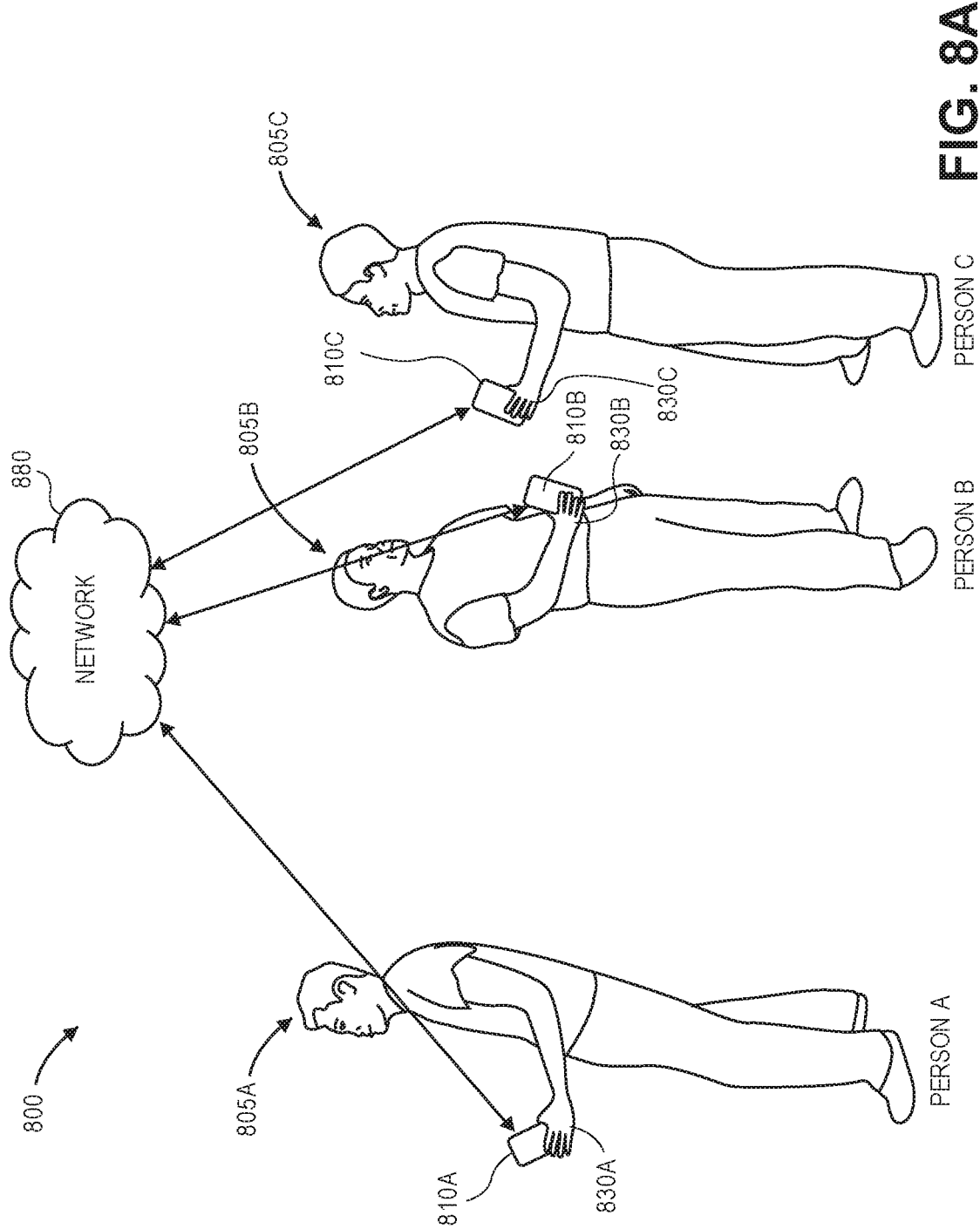

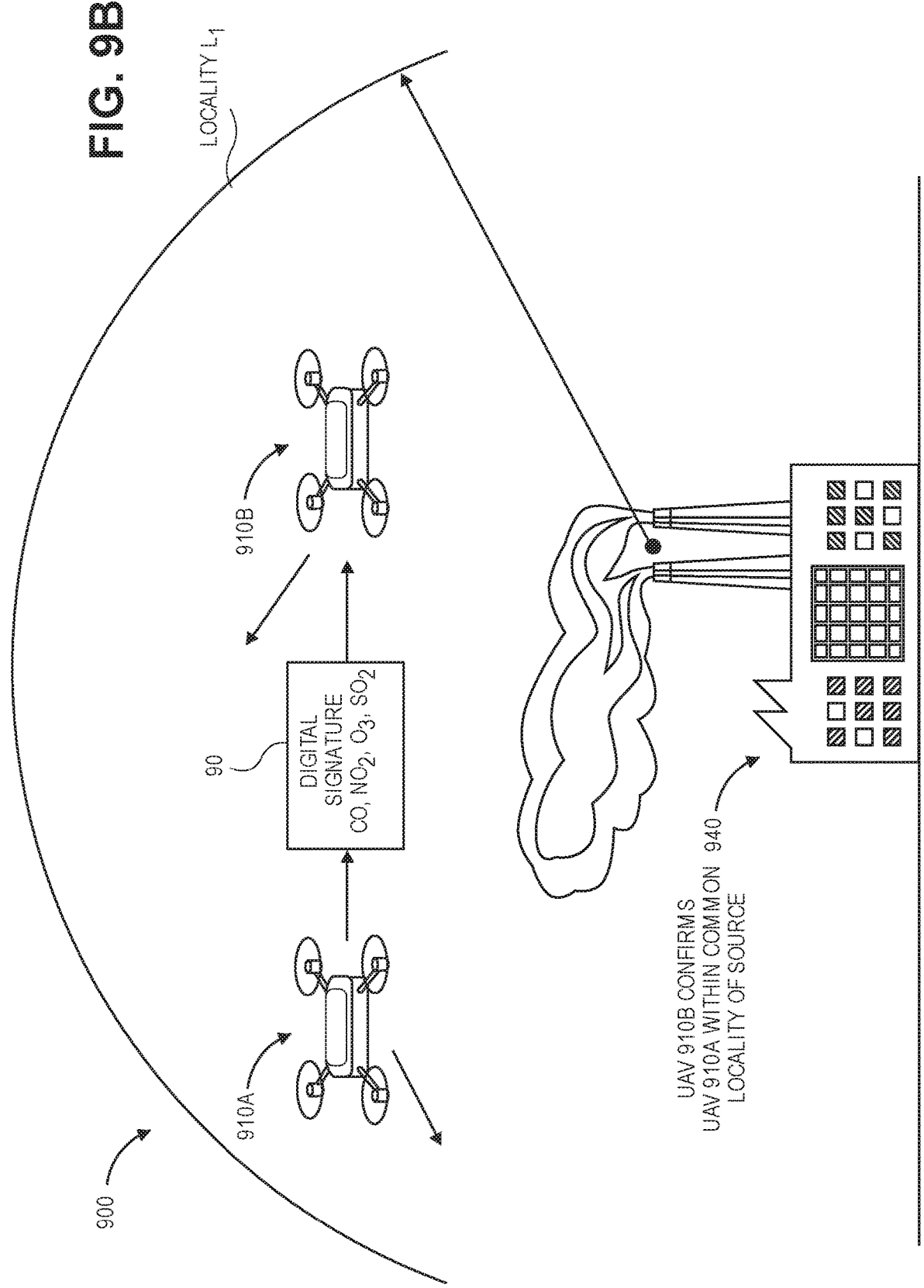

DETERMINING RELATIVE POSITIONS AND TRUSTING DATA BASED ON LOCALLY SENSED EVENTS

BACKGROUND

Over the last several decades, advancements in technology have enabled the development of communications systems with ever-smaller transceivers, antennas and other components that are configured to communicate according to an increasing number of protocols, standards or techniques. Today, a wide variety of machines or devices such as appliances, automobiles, cellular telephones, computers, glasses, luggage and wristwatches, and many others, may be equipped with systems that enable such machines or devices to instantly communicate with one another via any number of wireless technologies. The rapid onset of small, versatile communications components has contributed to the growth of a phenomenon known as the "Internet of Things," a theory that any type or form of object may be connected to an underlying network of systems or sensors and configured to exchange information or data between one another.

The interconnectedness of machines or devices has had a profound impact on transportation systems, such as unmanned aerial vehicles or autonomous ground-based vehicles, as well as mobile devices, such as smartphones or tablet computers. For example, unmanned aerial vehicles are typically equipped with one or more transceivers or other components for communicating with other vehicles, or with other systems, for transmitting information or data (e.g., instructions) to such vehicles, or receiving information or data from such vehicles. Mobile devices are often programmed with a number of applications for communicating with servers or other computer systems.

Accordingly, the demand for secure communications between two or more devices or systems continues to grow. For example, where unmanned aerial vehicles or mobile devices are configured to exchange or share information or data regarding local conditions (e.g., environmental or operating conditions, events, hazards or occurrences), a first unmanned aerial vehicle or mobile device must be able to confirm that a second unmanned aerial vehicle or mobile device is qualified to transmit information or data regarding its surroundings, and that information or data received from the second unmanned aerial vehicle or mobile device is legitimate.

BRIEF DESCRIPTION OF THE DRAWINGS

FIGS. 7A through 7G are views of aspects of one system for determining relative positions or trusting data in accordance with embodiments of the present disclosure.

FIGS. 8A through 8C are views of aspects of one system for determining relative positions or trusting data in accordance with embodiments of the present disclosure.

FIGS. 9A and 9B are views of aspects of one system for determining relative positions or trusting data in accordance with embodiments of the present disclosure.

DETAILED DESCRIPTION

As is set forth in greater detail below, the present disclosure is directed to determining relative positions of or distances between two or more devices or systems, or trusting data exchanged between such devices or systems, based on data captured by each of the devices or systems during an event of interest. The devices or systems may include, but are not limited to, vehicles of any size, shape, type or form, including but not limited to aerial vehicles (e.g., unmanned aerial vehicles, or drones). Such devices or systems may be equipped with any number of sensors for capturing detectable data during the events of interest. For example, an event of interest may result in the emission, radiation, dispersion or other release of matter or energy. Sensors associated with an aerial vehicle, or another device or system, may be configured to capture data regarding such matter or energy (e.g., acoustic, optical, electromagnetic, chemical or other information or data) during the event of interest. A digital signature (or other representation of the captured data) may be generated based on the captured data and transmitted by a first aerial vehicle (or device or system) to a second aerial vehicle (or device or system) that may be similarly configured or equipped with one or more of the same sensors. The second aerial vehicle may also generate a digital signature based on data captured by such sensors. If the digital signatures are consistent with one another, the second aerial vehicle may confirm that the first aerial vehicle is within a locality defined by a range associated with the event, or that data previously or subsequently received from the first aerial vehicle may be trusted as authentic. Moreover, based on the digital signatures, the second aerial vehicle may estimate a relative distance to the first aerial vehicle or a position of the first aerial vehicle accordingly. The second aerial vehicle may then generate and transmit a message including a digital signature based on data captured by the second aerial vehicle. Upon receiving the message, the first aerial vehicle may likewise determine whether the digital signatures are consistent with one another, and confirm that the second aerial vehicle is within a locality defined by a range associated with the event, or that data previously or subsequently received from the second aerial vehicle may be trusted as authentic. The first aerial vehicle and the second aerial vehicle may capture data at any number of times, generate digital signatures or other representations of captured data, and transmit messages including such signatures between one another, thereby enabling the aerial vehicles to determine whether the aerial vehicles remain within a common locality, to increase levels of confidence or accuracy in positions of the aerial vehicles, to track one another over time, or to confirm that data received from one another may be trusted.

Figure 1A:
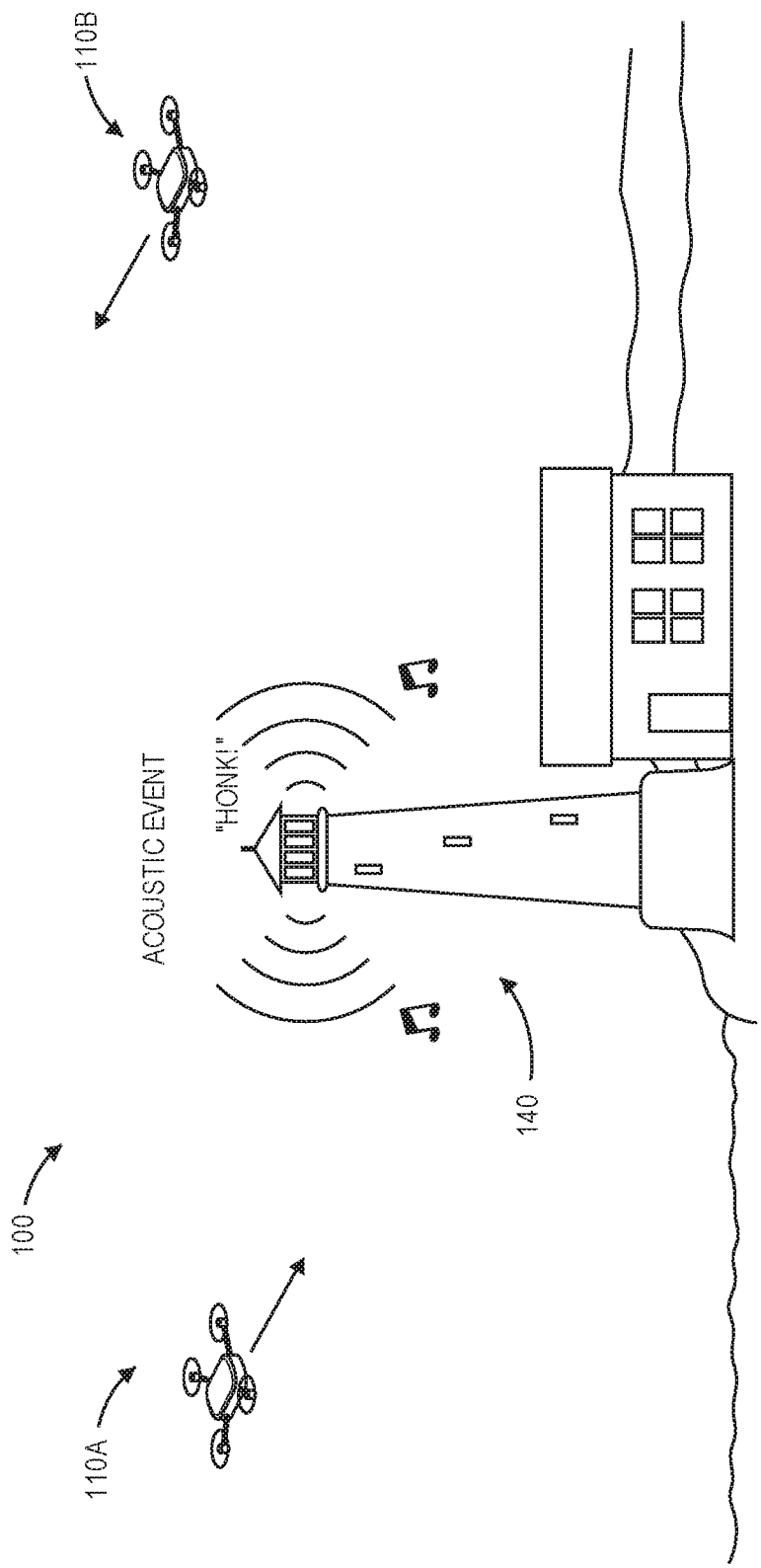
FIGS. 1A through 1J are views of aspects of one system for determining relative positions or trusting data in accordance with embodiments of the present disclosure.
Figure 1B:
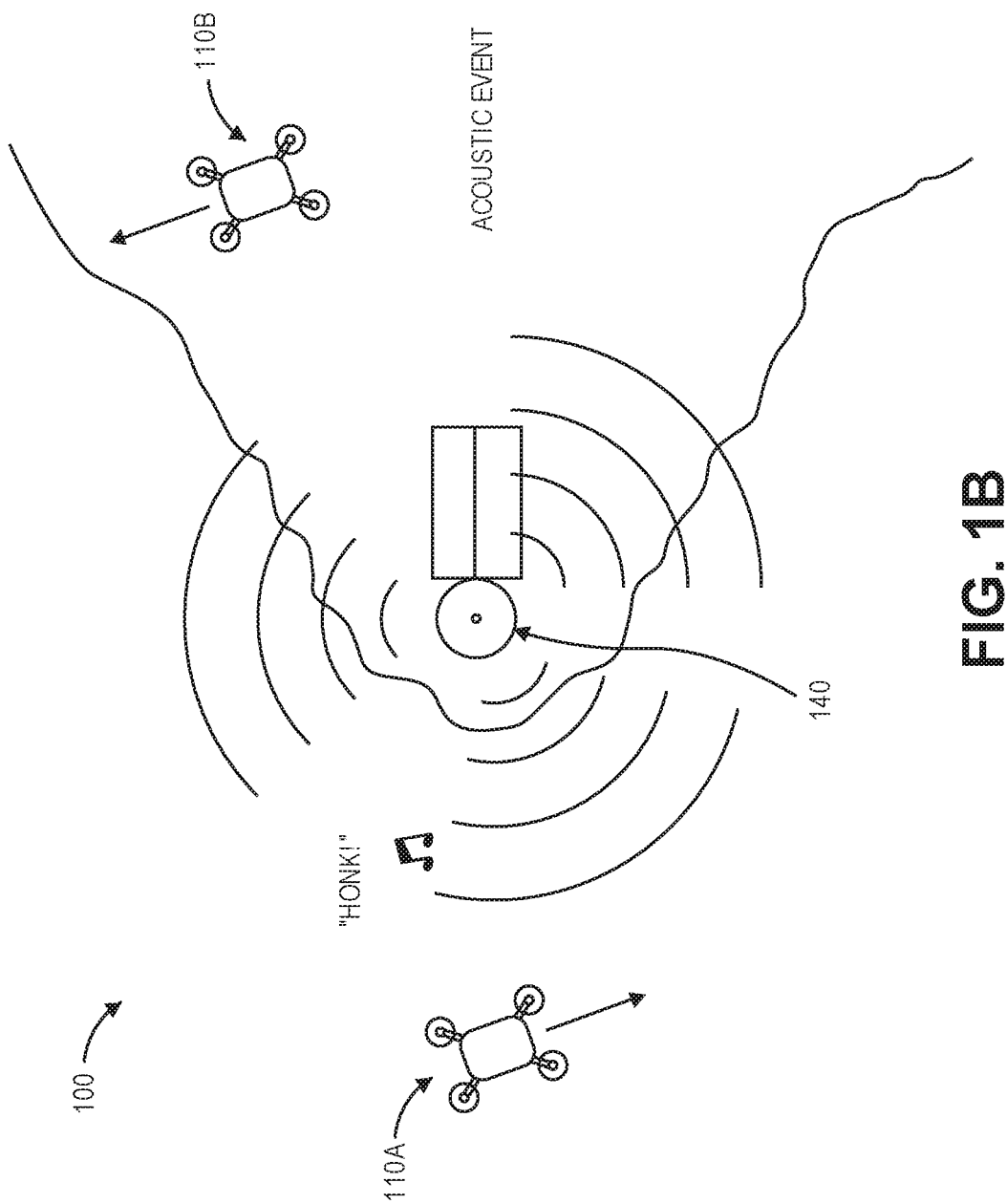

Referring to FIGS. 1A through 1J, views of aspects of one system 100 for determining relative positions or trusting data in accordance with embodiments of the present disclosure are shown. The system 100 includes a first aerial vehicle 110A, a second aerial vehicle 110B and an acoustic source 140 (e.g., a navigation aid) configured to emit one or more sounds or noises at predetermined intensities and/or within predetermined frequency spectra. The acoustic source 140 may be any type or form of sound generator such as a speaker, a horn (e.g., a foghorn), or the like that is configured to generate or emit acoustic energy, such as by a vibrating or oscillating piston, or by natural or artificial wind. As is shown in FIGS. 1A and 1B, the acoustic source 140 is configured to initiate an acoustic event characterized by one or more sounds or noises. Alternatively, the acoustic source 140 may also be configured to initiate any other type or form of event, such as an optical or light-based event. For example, in addition to one or more sound generators, the acoustic source 140 may include one or more light generators, or systems or components for generating or emitting light or any other form of matter or energy.

Figure 1C:
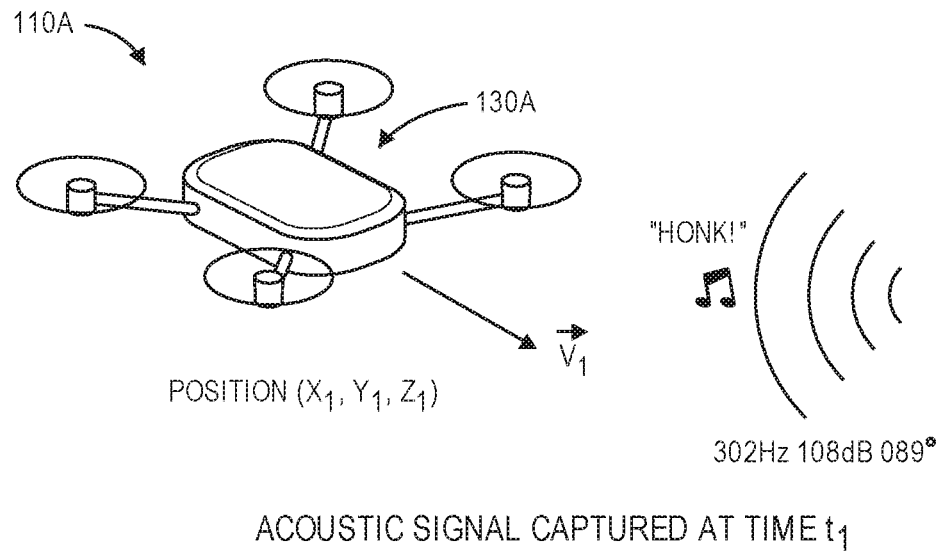

The aerial vehicles 110A, 110B may be configured with any number of sensors for capturing data associated with one or more events occurring within their vicinity. As is shown in FIG. 1C, the aerial vehicle 110A is equipped with an acoustic sensor 130A (e.g., a microphone, a piezoelectric sensor, or another sensor) configured to capture sound signals from one or more directions and convert such sound signals into electrical signals, e.g., by one or more ribbons, diaphragms or other components that are caused to be placed into motion by such sound signals. For example, as is shown in FIG. 1C, when the aerial vehicle 110A is located at a position $(x_1, y_1, z_1)$ and traveling at a velocity $V_1$, the acoustic sensor 130A captures acoustic signals (e.g., acoustic energy) at time $t_1$ from the acoustic event initiated by the acoustic source 140, including one or more sounds having a narrowband frequency of three hundred two hertz (302 Hz) and an intensity (or sound pressure level) of one hundred eight decibels (108 dB), as well as any number of other sounds having any other broadband or narrowband frequencies, or any other intensities (or sound pressure levels). The acoustic sensor 130A may also determine that the one or more sounds originated from a bearing of eighty-nine degrees (089°) with respect to the aerial vehicle 110A.

Figure 1D:
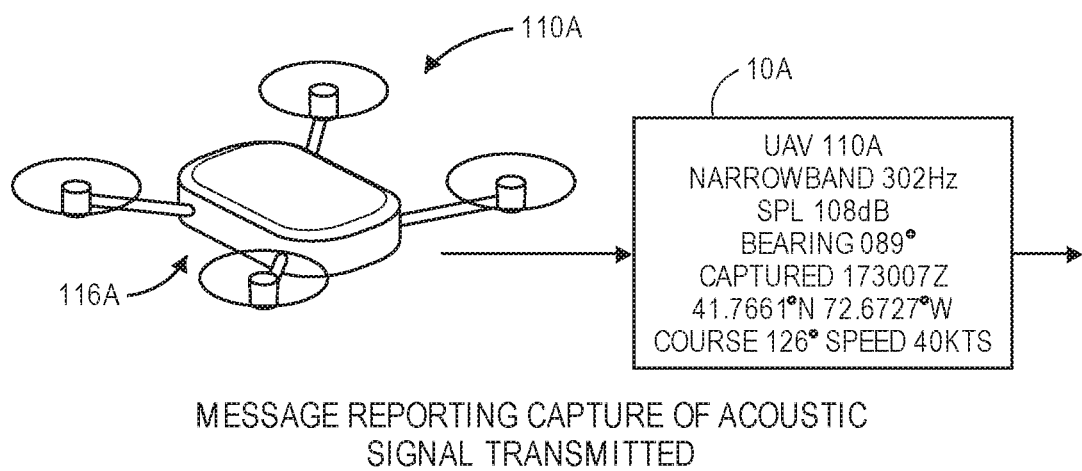

As is shown in FIG. 1D, the aerial vehicle 110A may be configured with one or more transceivers 116A for transmitting or receiving one or more signals or messages of any type or form. The aerial vehicle 110A transmits a message 10A by the transceiver 116A. The message 10A may be any type or form of electromagnetic signal that may be transmitted or received according to any protocol, including but not limited to a radiofrequency signal such as a Wireless Fidelity (or "Wi-Fi") signal or a Bluetooth® signal, a visible light signal (or "Li-Fi"), or the like. Alternatively, in some other embodiments, the message 10A may be an acoustic signal. The message 10A may be open and unencrypted, or subject to one or more forms or levels of encryption.

The message 10A includes an identifier of the aerial vehicle 110A, as well as identifiers of attributes of the acoustic energy captured by the acoustic sensor 130A at the time $t_1$ (e.g., a frequency, an intensity or sound pressure level, and a bearing), along with a time-stamp or a digital record of a time at which the message 10A was transmitted (viz., the time $t_1$) and the position $(x_1, y_1, z_1)$ and the velocity $V_1$ of the aerial vehicle 110A at the time $t_1$. The time-stamp may be determined by a global clock such as a Global Positioning System ("GPS") signal received by a GPS sensor, or from any other global clock or according to any global time standard. In some embodiments, the message 10A, or any other messages generated or transmitted by the aerial vehicle 110A, may include one or more visual representations of acoustic energy captured by the acoustic sensor 130A at the time $t_1$, or data for generating such visual representations. For example, the message 10A may include a spectrogram representative of the acoustic energy captured by the acoustic sensor 130A at the time $t_1$, or any other energy captured by one or more sensors, depicting frequencies of the acoustic energy over time or with respect to one or more other variables.

Figure 1E:
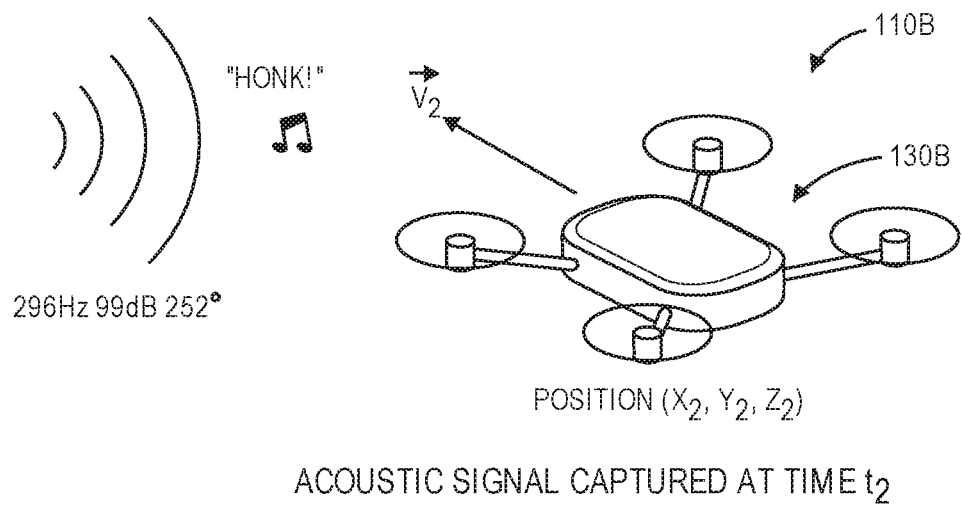

As is shown in FIG. 1E, the aerial vehicle 110B is also equipped with an acoustic sensor 130B configured to capture sound signals from one or more directions and convert such sound signals into electrical signals. For example, when the aerial vehicle 110B is located at a position $(x_2, y_2, z_2)$ and traveling at a velocity $V_2$, the acoustic sensor 130B captures acoustic signals (e.g., acoustic energy) at time $t_2$ from the acoustic event initiated by the acoustic source 140, including one or more sounds having a narrowband frequency of two hundred ninety-six hertz (296 Hz) and an intensity of ninety-nine decibels (99 dB). The acoustic sensor 130B may also determine that the one or more sounds originated from a bearing of two hundred fifty-two degrees (252°) with respect to the aerial vehicle 110B.

Figure 1F:
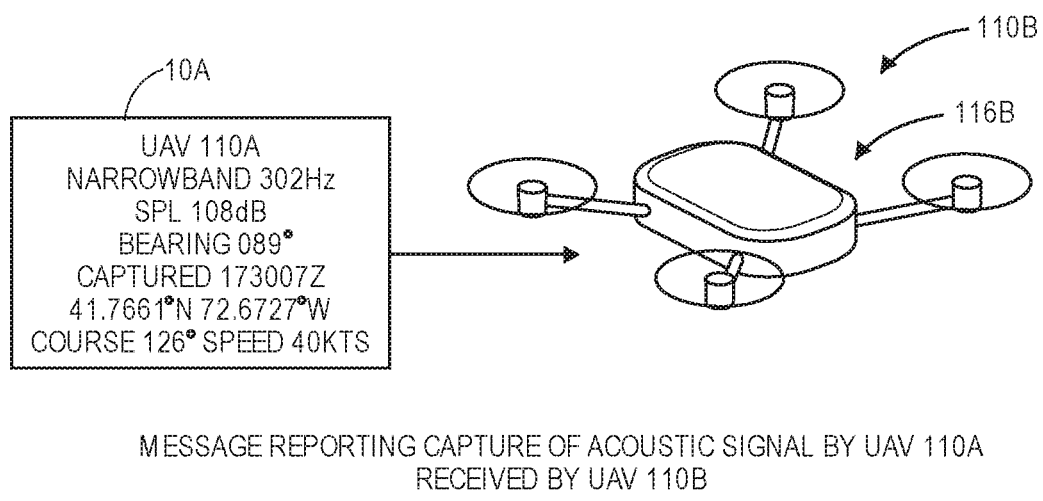

As is shown in FIG. 1F, the aerial vehicle 110B may also be configured with one or more transceivers 116B for transmitting or receiving one or more signals or messages of any type or form. The aerial vehicle 110B receives the message 10A by the transceiver 116B.

In accordance with some embodiments of the present disclosure, a system or device may determine that the system or device is positioned within a common locality with another system or device based on data captured by each of the respective systems or devices during one or more locally sensed events. For example, where each of the systems or devices is equipped with sensors to capture data during such events, one or more of the systems or devices may provide some or all of the captured data, or a representation of the captured data, such as a digital signature, to one or more other systems or devices. A system or device that receives captured data, or a representation of the captured data, from another system or device may compare the captured data or representation to data that it captured, or a representation of such data. If the data captured by two or more systems or devices, or representations of such data, is consistent with one another, then the systems or devices that captured such data may be determined to be within a common locality defined based on one or more characteristics of the event. For example, referring again to FIGS. 1A and 1B, where two or more systems or devices are determined to have captured acoustic data regarding the acoustic event initiated by the acoustic source 140, such systems or devices may be determined to be within a range of the acoustic source 140 defined by the acoustic event. Moreover, where bearings from each of such systems or devices to the acoustic source 140, or other information or data regarding the acoustic source 140, are known or determined, relative distances between the systems or devices may be calculated.

Figure 1G:
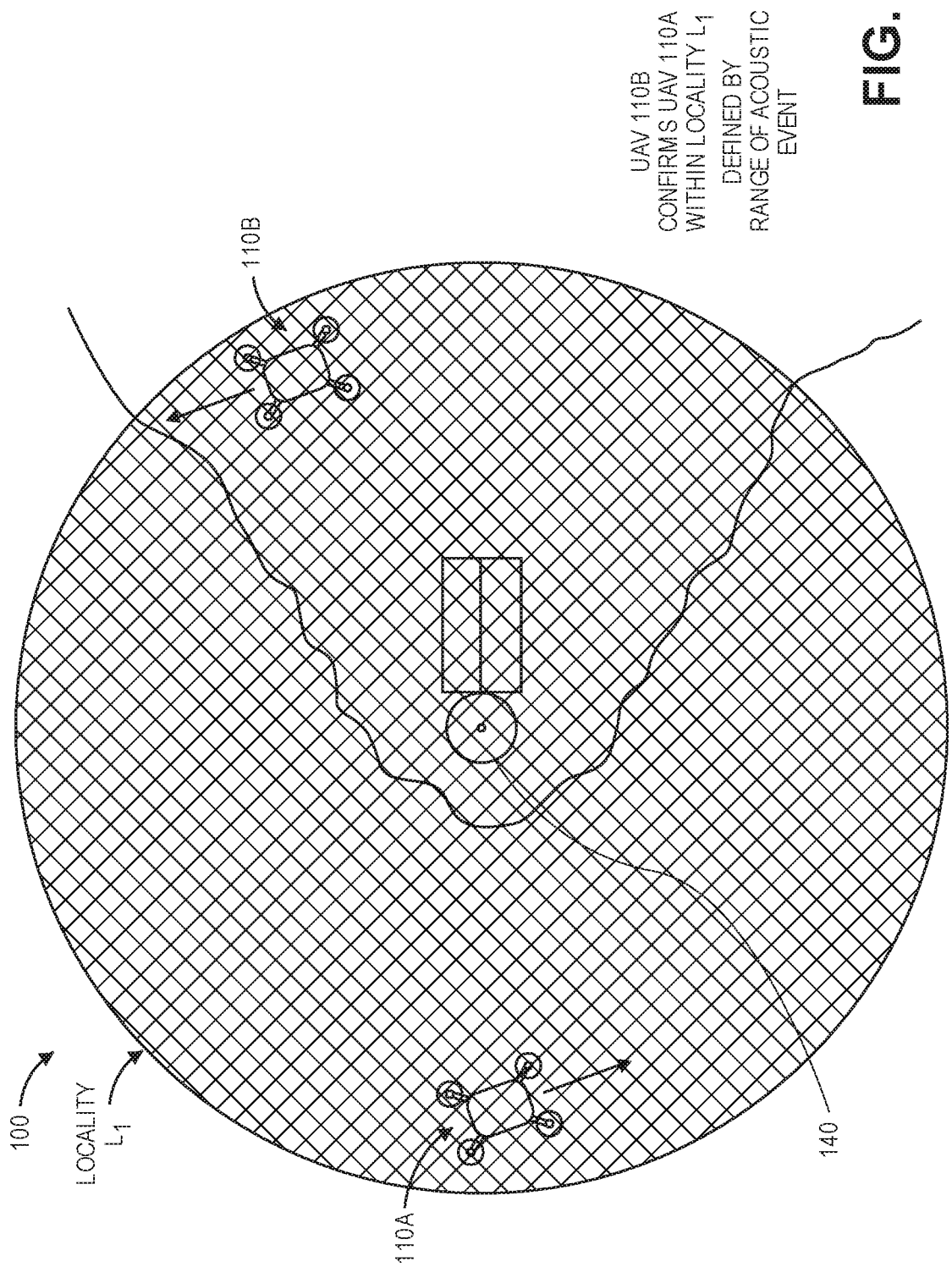

As is shown in FIG. 1G, upon comparing the content of the message 10A received from the aerial vehicle 110A, to the data captured by the sensor 130B, the aerial vehicle 110B may determine that the aerial vehicle 110A and the aerial vehicle 110B are both located within a common locality $L_1$ defined by an acoustic range of the acoustic source 140. For example, whereas the aerial vehicle 110A reported capturing narrowband tonals of approximately 302 Hz and with an intensity of approximately 108 dB at time $t_1$, the sensor 130B captured narrowband tonals of approximately 296 Hz and with an intensity of approximately 99 dB at time $t_2$. Where the time $t_1$ and the time $t_2$ are approximately the same, the aerial vehicle 110B may determine that the sensor 130B and the aerial vehicle 110A each captured data regarding a common event, and that both the aerial vehicle 110A and the aerial vehicle 110B are within the locality $L_1$ defined by attributes of the common event. Alternatively, where each of the aerial vehicles 110A, 110B is configured to capture and generate spectrograms representative of the acoustic energies captured thereby, and where the message 10A includes all or a portion of the spectrogram generated by the aerial vehicle 110A, the aerial vehicle 110B may compare the spectrogram included in the message to a spectrogram generated thereby. By such a comparison, the aerial vehicle 110B may determine that the aerial vehicle 110A and the aerial vehicle 110B are located within the common locality $L_1$ based on any similarity between such spectrograms, or, alternatively, that the aerial vehicle 110A and the aerial vehicle 110B are not located within the common locality $L_1$ based on any differences between such spectrograms.

Figure 1H:
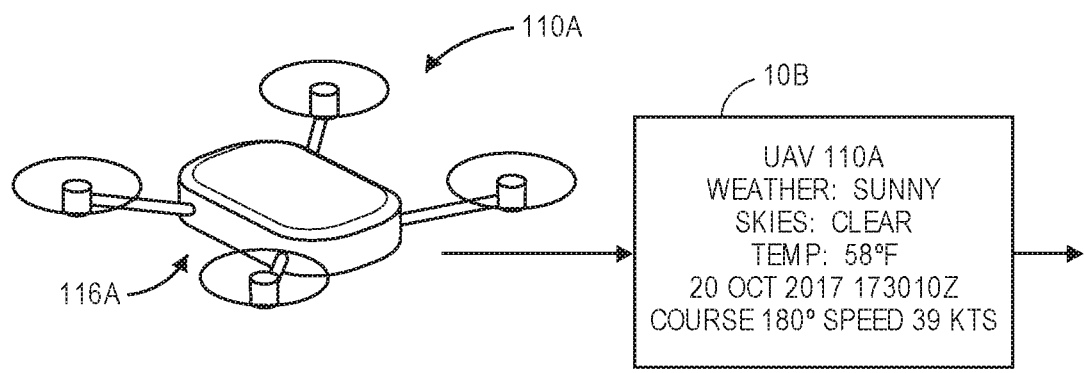

Upon determining that the aerial vehicle 110A and the aerial vehicle 110B are within the locality $L_1$, the aerial vehicle 110B may further determine that data received from the aerial vehicle 110A is trusted, e.g., as reliable and/or authentic. In some embodiments, the aerial vehicle 110B may determine that all data subsequently received from the aerial vehicle 110A is generally trusted. In some embodiments, however, the aerial vehicle 110B may determine that only data received from the aerial vehicle 110A that specifically relates to the locality $L_1$ may be trusted. For example, as is shown in FIG. 1H, the aerial vehicle 110A may generate a message 10B including a report of environmental and/or operating conditions within a vicinity, and transmit the message 10B by the transceiver 116A. The message 10B includes an identifier of the aerial vehicle 110A, as well as one or more indicators of weather, temperature, wind or other conditions sensed by the aerial vehicle 110A. The message 10B may further include a time-stamp or a digital record of a time at which the indicators of the weather, the temperature, the wind or the other conditions were determined, and a position of the aerial vehicle 110A at which such indicators were determined.

Figure 1I:
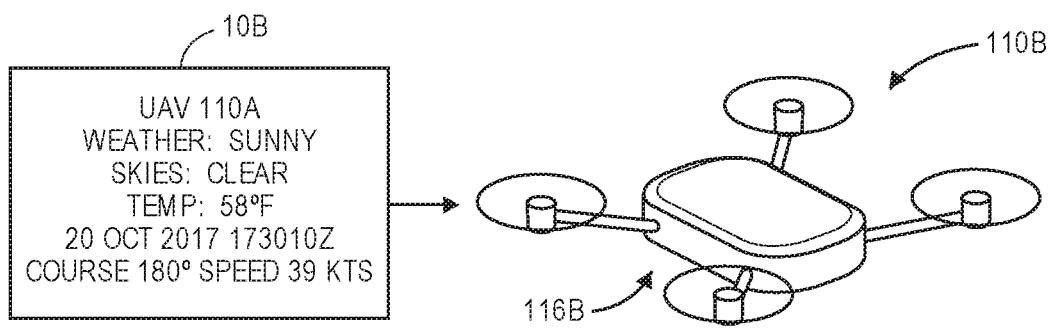

As is shown in FIG. 1I, after having determined that the aerial vehicle 110A is located within a common locality $L_1$ and that data received from the aerial vehicle 110A may be trusted, the aerial vehicle 110B receives the message 10B by the transceiver 116B and processes the data included in the message 10B with confidence that such data is relevant to environmental and/or operating conditions within the locality $L_1$.

Figure 1J:
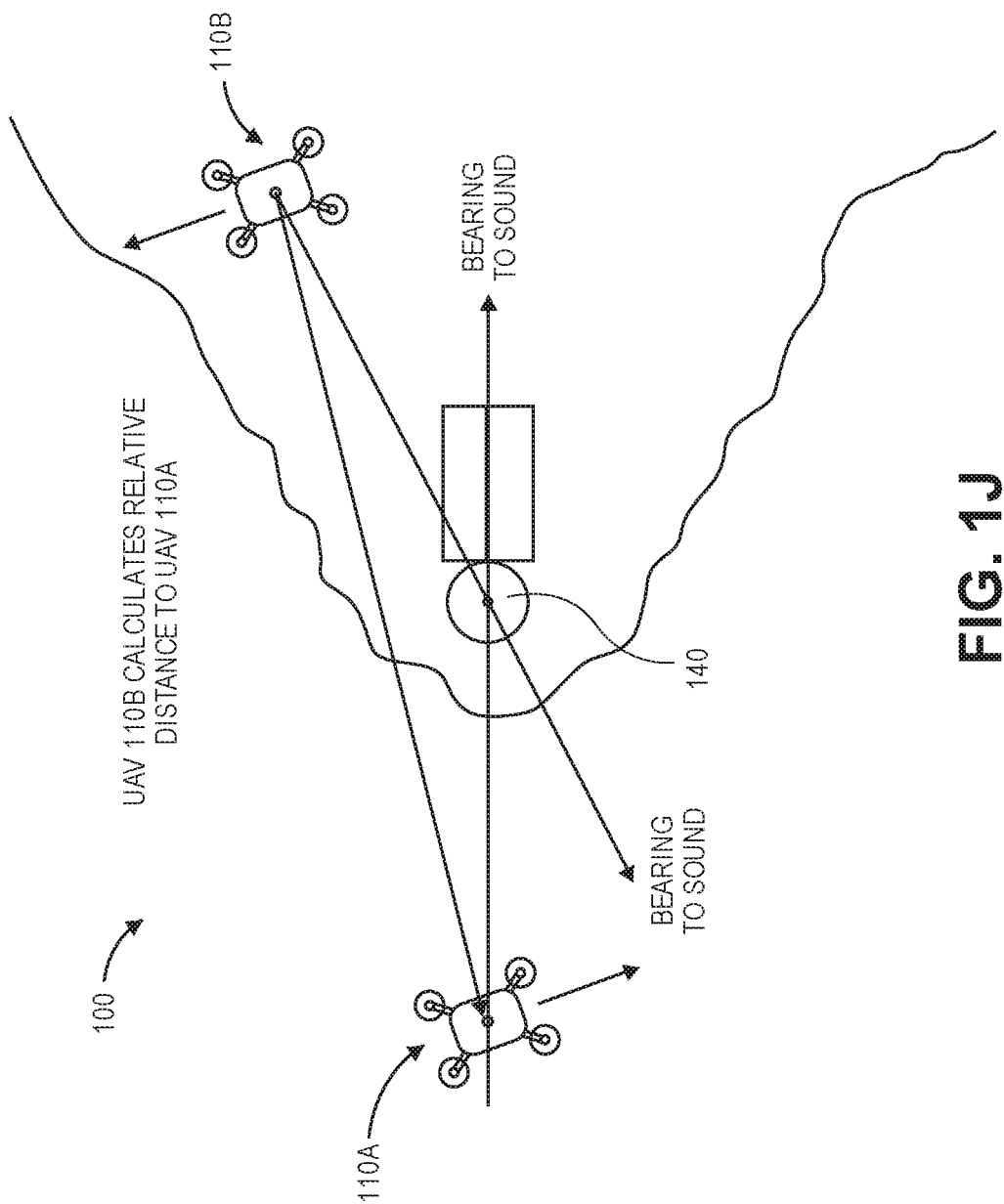

Additionally, as is shown in FIG. 1J, the aerial vehicle 110B may further determine information or data regarding a position of the aerial vehicle 110A within the locality $L_1$ according to one or more techniques. First, because the aerial vehicle 110B has determined that data received from the aerial vehicle 110A may be trusted, the aerial vehicle 110B may rely on the position data included in the message 10A, as shown in FIG. 1F, in determining the position of the aerial vehicle 110A within the locality $L_1$ at the time $t_1$. Alternatively, the aerial vehicle 110B may further determine the position of the aerial vehicle 110A within the locality $L_1$ based on the bearings from which each of the aerial vehicles 110A, 110B captured data regarding the sound, as well as the times $t_1$, $t_2$ at which each of the aerial vehicles 110A, 110B captured the data, e.g., by multiplying a difference between the times $t_1$, $t_2$ by the speed of sound. The aerial vehicle 110B may further account for any attenuation in the acoustic energy, e.g., differences in the intensities or sound pressure levels, based on the data captured by the respective aerial vehicles 110A, 110B. The aerial vehicle 110B may also account for any differences in frequencies of the acoustic energy, e.g., differences in either the narrowband tonals shown in FIGS. 1C and 1E, or differences in spectrograms representative of such frequencies, in determining a velocity of the aerial vehicle 110A. As is shown in FIG. 1J, a position and/or a relative distance may be shown or expressed in terms of a radius extending from the second transceiver 116B that received the message 10A to the first transceiver 116A that transmitted the message 10A, or in any other manner.

Alternatively, the aerial vehicle 110B may generate and transmit one or more messages including signatures or other representations of the data captured by the sensor 130B, thereby enabling the aerial vehicle 110A to likewise determine that the aerial vehicle 110A and the aerial vehicle 110B are both located within a common locality defined by an acoustic range of the acoustic source 140 upon receiving the messages. Furthermore, the aerial vehicles 110A, 110B may transmit any number of messages over time, with such messages including signatures or other representations of data captured by the sensors 130A, 130B. Such messages may enable the aerial vehicles 110A, 110B to determine whether they remain within a common locality defined by the acoustic source 140, to increase a level of confidence or accuracy of one or more positions or distances determined based on such data, to track one another over time, or to confirm whether data exchanged between one another may continue to be trusted as accurate or relevant, or for any other purpose. For example, where the aerial vehicle 110B determines a position of the aerial vehicle 110A at a first time, and a position of the aerial vehicle 110B at a second time, based on messages received from the aerial vehicle 110A, the aerial vehicle 110B may determine or generate a vector corresponding to a course and a speed of the aerial vehicle 110A over time, subject to any factors relating to accuracy and/or tolerances of the messages or the concentrations, and may track the aerial vehicle 110A accordingly. The aerial vehicle 110A may track the aerial vehicle 110B in a similar fashion.

Accordingly, the systems and methods of the present disclosure are directed to determining relative positions of or distances between devices or systems (including but not limited to aerial vehicles), or trusting data exchanged between such devices or systems, based on data captured by each of such devices or systems during a locally sensed event of interest. Where each of the devices or systems captures similar or identical data, or data that is consistent with one another, the devices or systems may be determined to be located within a locality defined with respect to a source of the data. The devices or systems may exchange data, or representations or summaries of such data (e.g., digital signatures generated based on such data), and compare the data, representations or summaries to one another. Where one of the devices or systems determines that data captured by two or more of the respective devices or systems is consistent with one another, the devices or systems may be determined to be within a common locality. Accordingly, upon determining that the devices or systems are within a common locality, data received by such devices or systems from one another may be trusted, particularly where such data is relevant to the common locality within which the devices or systems are located.

The devices or systems of the present disclosure may be equipped, outfitted or configured with any number of sensors or sensing components. For example, referring again to FIGS. 1A through 1J, the aerial vehicles 110A, 110B are configured to capture acoustic information or data generated during events by the sensors 130A, 130B. In addition to the sensors 130A, 130B, such devices or systems (including but not limited to aerial vehicles) may be further equipped with any number of other sensors, including but not limited to sensors for capturing information or data regarding the operation of such devices or systems, or environments in which such devices or systems are provided, e.g., position sensors, velocity sensors, acceleration sensors, orientation sensors, acoustic sensors, light sensors (e.g., imaging devices), temperature sensors, pressure sensors, humidity sensors, wind speed or air speed sensors, air quality sensors, or the like.

Furthermore, the operation of the one or more devices or systems may be triggered in any manner in accordance with the present disclosure. For example, where a device or system determines on any basis that an event has occurred, or may have occurred, within its vicinity, the device or system may begin capturing data regarding the event by any number of sensors associated therewith. Alternatively, the one or more sensors may continuously capture and monitor data to determine whether an event has occurred. Where data captured by the one or more sensors exceeds a predetermined threshold (e.g., a mean) by a predetermined amount, percentage or share, the event may be determined to have occurred. For example, where one or more acoustic sensors provided in association with a device or system detects a sound having an intensity (or sound pressure level) in excess of a predetermined threshold or a frequency within a predetermined frequency spectrum, an event may be determined to have occurred. Subsequently, the device or system may generate and transmit one or more messages describing or characterizing the sound that was detected. For example, such messages may comprise some or all of the data, or a digital signature or other representation of the data, as well as any intrinsic or extrinsic information or data regarding the device or system. Any other devices or systems that receive the one or more messages may determine whether the device or system that transmitted such messages is within a common locality. For example, such devices or systems may compare the content of the message (e.g., the data and/or representation included therein) to any data captured by sensors operating thereon, or to digital signatures or other representations calculated based on such data. Where the data and/or the digital signatures are consistent with one another, the devices or systems may be determined to have observed or detected a common event, and may be determined to be within a common locality associated with the common event based on their observation or detection of the common event. Positions and/or sizes of the common locality may be defined based on attributes of the data or the common event.

The types of data that may be captured and evaluated to determine whether an event has occurred, or to determine whether two or more devices or systems observed or detected the event, are not limited. For example, in addition to acoustic signals, data regarding observed light (e.g., light within the visible spectrum, or infrared or ultraviolet light beyond the visible spectrum); electromagnetic signals, waves, fields or other data of any intensity or within any frequency spectrum; contents of air or other media within which such devices or systems are provided (e.g., the presence or concentration of common elements or molecules such as oxygen, nitrogen, or carbon dioxide, as well as sulfur dioxide, nitrous oxide, ozone or other less common materials, as well as one or more pollutants and/or pathogens); radiation (e.g., alpha, beta or gamma radiation); or any other matter or energy may be detected and used to determine that an event has occurred, or to define a locality associated with the event. Similarly, the devices or systems may be configured to capture biometric data, e.g., data regarding sounds or substances emitted by one or more humans or animals, and such biometric data may be detected and used to determine that a biometric event has occurred, or to define a locality associated with the biometric event.

Additionally, an event may be determined to have occurred based on data captured from two or more sources, and localities may be defined with respect to each of such sources to further determine positions of two or more devices or systems, or a relative distance between such devices or systems. For example, referring again to FIGS. 1A through 1J, the acoustic source 140 may be further configured to emit light (e.g., one or more concentrated beams of light that may be aimed or directed by one or more specific lenses and emitted in fixed or variable directions, such as by a revolving emitter), in addition to acoustic signals. Where the aerial vehicles 110A, 110B are outfitted with sensors for capturing light (e.g., one or more imaging devices or other sensors), as well as the sensors 130A, 130B for capturing acoustic energy, the event may be detected by each of the aerial vehicles 110A, 110B based on either acoustic energy or light, or both acoustic energy and light. For example, such sensors may determine an elevation angle (or altitude angle), a zenith angle, an azimuth angle, or any other angle to a source of the light, as well as frequencies or intensities of the captured light. Localities may be defined with respect to data regarding either the captured acoustic energy or the captured light, or both the captured acoustic energy and the captured light, and the aerial vehicles 110A, 110B may be determined to be located within a common locality where the data regarding the acoustic energy and/or the light, or digital signatures or other representations of the energy or light that have been generated based on such data, are consistent with one another.

Any attributes of the data captured by devices or systems may be used to define localities and/or determine whether two or more devices or systems are within a common locality in accordance with the present disclosure. For example, where two devices or systems are determined to have captured data regarding a common event, the two devices or systems may be presumed to be within a locality defined by the captured data, subject to any losses, attenuation, degradation, diffusion, diffraction, degradation or other physical effects (e.g., velocities of the devices or systems or the sources, which may cause frequencies to vary according to the Doppler effect). Alternatively, where two or more devices or systems are determined to be presumed to be within two or more localities defined by two or more sets of captured data, e.g., a locality defined by sound data and a locality defined by light data, the devices or systems may be presumed to be located within a geographic region, space, area or volume defined by an intersection of the respective localities. For example, a first set of devices or systems may be determined to be located within a common locality defined based on one set of data captured in association with one event, while a second set of devices or systems (e.g., a subset of the first set of devices or systems) may be determined to be located within a common locality defined based on another set of data captured in association with the same event, or with a different event.

Alternatively, where data captured during an event provides one or more indicators as to a location of one or more devices or systems with respect to the event, such data may be used to determine positions of two or more of such devices or systems, e.g., a relative distance between such devices or systems. Where one device or system detects data regarding an event at one time, and another device or system detects data regarding the same event at another time, a difference between the times may provide an indication as to a relative distance between the respective devices or systems. For example, where a first sensor captures acoustic data resulting from an event at a first time, and a second sensor captures acoustic data resulting from the event at a second time, a product of the speed of sound and the difference between the first time and the second time is equal to a difference between the distances of the first and second sensors from a source of the event: where the first sensor captures acoustic signals one-tenth of one second before the second sensor captures the same acoustic signals, the first sensor is known to be approximately 109 feet (or 33.2 meters) closer to the source of the event than the second sensor. Such times may be determined by any method or technique, e.g., by a global clock. Moreover, differences in distances may be determined based on differences between times at which signals of any kind (e.g., light, electromagnetic signals or waves, or any other signals) are captured. In addition to time, any other attribute of data captured following an event may be analyzed and compared to determine relative positions of one or more devices or systems, or distances between such devices or systems.

Furthermore, relative positions of devices or systems or distances between devices or systems may also be determined based on differences in values of the data captured by such devices or systems. For example, where a pair of devices or systems are determined to be in a common locality defined by air quality or atmospheric content, e.g., concentrations of airborne particulates or other substances such as moisture, dust, smog, pollutants or pathogens, relative positions or distances between the devices or systems may be determined based on the respective concentrations, such that devices or systems that are nearest to a source of the particulates or substances will have higher concentrations of such particulates or substances and devices or systems that are farther from the source will have lower concentrations of such particulates or substances. Additionally, calculating relative positions or distances may take into account any other variable or factor that may lead to losses, attenuation, degradation, diffusion, diffraction, degradation or other variations in data. For example, such relative positions or distances may be calculated by taking into account effects of wind or other weather events on concentrations or content sensed by a particular device or system.

A digital signature may be a message, or a portion of a message, that may be interpreted to confirm that a specific device or system transmitted the message, or another message, to another device or system. The digital signature may be used to prove not only that one device or system transmitted a message to another device or system but also that the given message is, in fact, the message that was sent. In some embodiments, a digital signature may be generated according to any algorithms, method or techniques by a single device or system and interpreted by any device or system, thereby ensuring that a message that includes the digital signature, or is associated with the digital signature, could not have been produced by any other device or system. Additionally, a digital signature may be encrypted. In accordance with some embodiments of the present disclosure, a digital signature or other representation of data captured by one or more sensors associated with a device or system may be generated in any manner, and may take any form. For example, digital signatures may be formed from any number of digits or alphanumeric characters, and may comprise any number of bits or bytes of data. The digits or characters may include some or all of the data captured by a device or system relating to an event or, alternatively, may represent a level, a status, a value, or any other attribute of such data, e.g., a spectrogram of such data. For example, the digital signature may include one or more digits or characters corresponding to an intensity or a frequency of a sound, an intensity or a frequency of a light (e.g., sunlight), a level or amount of a component of air or another medium, or any other digits or characters for representing such values. Alternatively, a digital signature may include one or more digits or characters indicative of such values. For example, the digital signature may include a specific digit or character where a sound intensity is within a first range (e.g., zero and ten decibels), another specific digit or character where the sound intensity is within a second range (e.g., between ten and twenty decibels), and so on and so forth. Similarly, a digital signature may include a specific digit or character where a frequency is within a first frequency spectrum (e.g., between zero and one hundred hertz), another specific digit or character where a frequency is within a second frequency spectrum (e.g., between one hundred and two hundred hertz), and so on and so forth. Moreover, the digital signatures may precede, follow, or be embedded or included within content of a message, or be transmitted as a discrete message, or otherwise shared in any manner.

In some embodiments, one or more messages may be radiofrequency (or "RF") signals that are transmitted and received according to any protocol. Such messages may have any amplitude and/or phase, and may have a frequency residing generally within a range between approximately three kilohertz and approximately three hundred gigahertz (or 3 kHz to 300 GHz). For example, the messages may include Wi-Fi signals, Bluetooth® signals, amplitude modification (AM) radio signals, frequency modulation (FM) signals, or any other signals residing within similar frequency spectra. The one or more messages may also be light-based or optical signals, such as emissions of light such as specifically programmed, timed or scheduled flickers from light-emitting diodes (or "LED") or other light sources, that are encoded with information or data that may be captured and interpreted by one or more optical sensors. The one or more messages may also be acoustic signals, such as tones that may be emitted at predetermined intensities and/or within predetermined frequency spectra and encoded with information or data that may be captured and interpreted by one or more acoustic sensors. Times at which such messages are transmitted and received may be determined with precision and accuracy through the use of a global clock or according to a global time standard. Accordingly, the messages may be transmitted and/or received by any components that are configured to transmit and/or receive such signals. Moreover, the messages may be transmitted by discrete transmitting components, received by discrete receiving components, or transmitted and received by transceivers or other components that are configured to not only transmit but also receive such messages.

The systems and methods of the present disclosure may be utilized in real time or in near-real time, or at a later time, to determine whether two or more devices or systems are or were within a common locality or, alternatively, whether the two or more devices or systems are not or were not within the common locality. For example, in some embodiments, a device or system may be configured to capture information or data (e.g., acoustic data, light data, air quality data, or any other data) by one or more sensors. The information or data captured thereby may be subsequently (e.g., forensically) processed to determine whether the devices or systems were previously within a common locality, or to confirm that such devices or systems were not previously within the common locality. For example, an aerial vehicle or a mobile device may be configured to capture sounds, light or other data over a period of time. The aerial vehicle or the mobile device may transmit some or all of such data to a processing system that may determine, based on such data, whether the aerial vehicle or a user of the mobile device was, or was not, within a common locality with another sensor-equipped device or system, e.g., another aerial vehicle or another mobile device during the period of time.

Figure 2:
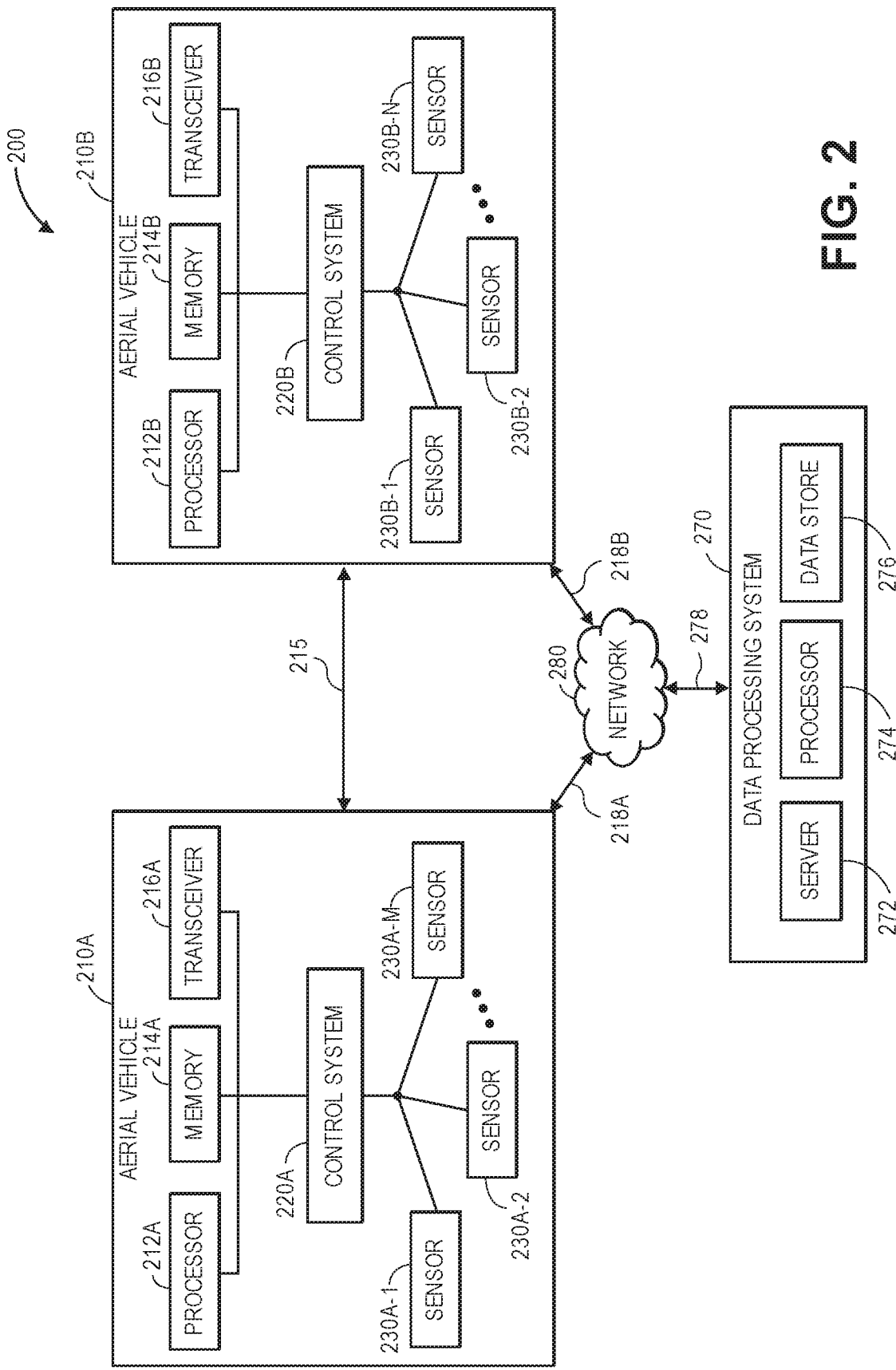
FIG. 2 is a block diagram of one system for determining relative positions or trusting data in accordance with embodiments of the present disclosure.

Referring to FIG. 2, a block diagram of one system 200 for determining relative positions or trusting data in accordance with embodiments of the present disclosure is shown. The system 200 of FIG. 2 includes an aerial vehicle 210A, an aerial vehicle 210B and a data processing system 270 that are connected to one another over a network 280, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1J.

As is shown in FIG. 2, the aerial vehicle 210A and the aerial vehicle 210B are similarly configured. The aerial vehicle 210A includes a processor 212A, a memory 214A and a transceiver 216A. The aerial vehicle 210A further includes a control system 220A and a plurality of sensors 230A-1, 230A-2 . . . 230A-m. Likewise, the aerial vehicle 210B includes a processor 212B, a memory 214B and a transceiver 216B. The aerial vehicle 210B further includes a control system 220B and a plurality of sensors 230B-1, 230B-2 . . . 230B-n. Additionally, the aerial vehicles 210A, 210B may each include any number of other components, including but not limited to airframes, propulsion motors, propellers, control surfaces, item engagement systems, landing gear components, lighting systems, or others.

The processors 212A, 212B may be configured to perform any type or form of computing function, including but not limited to the interpretation of data within one or more signals captured by the sensors 230A-1, 230A-2 . . . 230A-m or the sensors 230B-1, 230B-2 . . . 230B-n, or the generation of digital signatures or other representations from such data. For example, the processors 212A, 212B may control any aspects of the operation of the aerial vehicles 210A, 210B and any computer-based components thereon, including but not limited to propulsion motors, propellers, control surfaces, item engagement systems, landing gear components, lighting systems, imaging devices or other operational or environmental sensors. For example, the processors 212A, 212B may control the operation of one or more control systems or modules, such as the control systems 220A, 220B, for generating instructions for conducting operations of the aerial vehicles 210A, 210B, including but not limited to instructions for causing propulsion motors to operate at a predetermined or selected speed, for causing propellers to rotate at a predetermined or selected pitch or configuration, or for causing one or more sensors to capture information or data of any type or form. Similarly, the processors 212A, 212B may control the operation of one or more control surfaces (not shown), including but not limited to wings, rudders, ailerons, elevators, flaps, brakes, slats or other features. Such control systems or modules may be associated with one or more other computing devices or machines, and may communicate with the data processing system 270 or one or more other computer devices (not shown) over the network 280, through the sending and receiving of digital data, as indicated by lines 218A, 218B.

The processors 212A, 212B may be a uniprocessor system including one processor, or a multiprocessor system including several processors (e.g., two, four, eight, or another suitable number), and may be capable of executing instructions. For example, in some embodiments, the processors 212A, 212B may be a general-purpose or embedded processor implementing any of a number of instruction set architectures (ISAs), such as the x86, PowerPC, SPARC, or MIPS ISAs, or any other suitable ISA. Where one or more of the processors 212A, 212B is a part of a multiprocessor system, each of the processors within the multiprocessor system may implement the same ISA, or different ISAs.

Additionally, the memory or storage components 214A, 214B (such as databases or data stores) are configured for storing any type of information or data, e.g., instructions for operating the aerial vehicles 210A, 210B, or information or data captured during operations of the aerial vehicles 210A, 210B. The memory components 214A, 214B may be configured to store executable instructions, flight paths, flight control parameters and/or other data items accessible by or to the processors 212A, 212B. The memory components 214A, 214B may be implemented using any suitable memory technology, such as static random-access memory (SRAM), synchronous dynamic RAM (SDRAM), nonvolatile/Flash-type memory, or any other type of memory. In some embodiments, program instructions, flight paths, flight control parameters and/or other data items may be received or sent via the transceivers 216A, 216B, e.g., by transmission media or signals, such as electrical, electromagnetic, or digital signals, which may be conveyed via a communication medium such as a wired and/or a wireless link.

The transceivers 216A, 216B may be configured to enable the aerial vehicles 210A, 210B to communicate using one or more wired or wireless systems or components, e.g., wired technologies such as Universal Serial Bus (or "USB") or fiber optic cable, or standard wireless protocols, such as over the network 280 or directly. In some embodiments, the transceivers 216A, 216B may be configured to transmit and receive electromagnetic signals, such as one or more radiofrequency signals, and may include one or more components configured to transmit such signals according to Bluetooth® or any Wireless Fidelity (or "Wi-Fi") protocol. In some embodiments, the transceivers 216A, 216B may be configured to transmit and receive light signals, and may include one or more light emitting diode (or "LED") transmitters and/or one or more optical sensors or receivers. In still other embodiments, the transceivers 216A, 216B may be configured to transmit and receive acoustic signals, and may include one or more devices having transducers for converting electrical signals into sound energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters, as well as one or more microphones, piezoelectric sensors, vibration sensors or other acoustic sensors. In accordance with the present disclosure, each of the transceivers 216A, 216B may be configured to transmit signals to one another, or receive signals from one another, as indicated by line 215. Such signals may be open and unencrypted, and captured and interpreted by any vehicle, station or object within a signal range of the transceivers 216A, 216B, or subject to any form or level of encryption.

The transceivers 216A, 216B may further include or be in communication with one or more input/output (or "I/O") interfaces, network interfaces and/or input/output devices, and may be configured to allow information or data to be exchanged between one or more of the components of the aerial vehicles 210A, 210B, or to one or more other computer devices or systems (e.g., other aerial vehicles, not shown) via the network 280. For example, in some embodiments, the transceivers 216A, 216B may be configured to coordinate I/O traffic between the processors 212A, 212B and one or more onboard or external computer devices or components. The transceivers 216A, 216B may perform any necessary protocol, timing or other data transformations in order to convert data signals from a first format suitable for use by one component into a second format suitable for use by another component. In some embodiments, the transceivers 216A, 216B may include support for devices attached through various types of peripheral buses, e.g., variants of the Peripheral Component Interconnect (PCI) bus standard or the Universal Serial Bus (USB) standard. In some other embodiments, functions of the transceivers 216A, 216B may be split into two or more separate components, or integrated with the processors 212A, 212B. Although the transceivers 216A, 216B are shown as single components for transmitting and/or receiving information or data, those of ordinary skill in the pertinent arts will recognize that the aerial vehicles 210A, 210B may each include any number of transceivers, or, alternatively or additionally, any number of transmitting and/or receiving devices that may be provided as discrete components.

The control systems 220A, 220B may include one or more electronic speed controls, power supplies, navigation systems and/or payload engagement controllers for controlling the operation of the aerial vehicles 210A, 210B and for engaging with or releasing items (not shown), as desired. For example, the control systems 220A, 220B may be configured to cause or control the operation of one or more of propulsion motors, propellers, sensors or other aspects of the aerial vehicles 210A, 210B, such as to cause one or more of propulsion motors to rotate propellers at a desired speed, in order to guide the aerial vehicles 210A, 210B along a determined or desired flight path, or to perform any other function. The control systems 220A, 220B may also be configured to cause or control the operation of the one or more sensors 230A-1, 230A-2 . . . 230A-m, or the sensors 230B-1, 230B-2 . . . 230B-n. The control systems 220A, 220B may further control other aspects of the aerial vehicles 210A, 210B, including but not limited to the operation of one or more control surfaces (not shown) such as wings, rudders, ailerons, elevators, flaps, brakes, slats or other features within desired operating ranges, or the enactment with or release of one or more items by one or more engagement systems (not shown). In some embodiments, the control systems 220A, 220B may be integrated with one or more of the processors 212A, 212B, the memory components 214A, 214B and/or the transceivers 216A, 216B.

The sensors 230A-1, 230A-2 . . . 230A-m and/or the sensors 230B-1, 230B-2 . . . 230B-n may be configured to capture any information or data during the operation of the aerial vehicles 210A, 210B. The information or data captured by such sensors may relate to the aerial vehicles 210A, 210B, or to environments in which the aerial vehicles 210A, 210B are operating. For example, the sensors 230A-1, 230A-2 . . . 230A-m or the sensors 230B-1, 230B-2 . . . 230B-n may include one or more sensors for capturing information or data regarding a position, a velocity or an acceleration of the aerial vehicles 210A, 210B in real time or near-real time, such as a Global Positioning System ("GPS") receiver or sensor, a compass, a speedometer, an altimeter (e.g., any number of emitters, receivers, or laser or radar range finders), or a gyroscope (e.g., a traditional mechanical gyroscope having at least a pair of gimbals and a flywheel or rotor, or a dynamically tuned gyroscope, a fiber optic gyroscope, a hemispherical resonator gyroscope, a London moment gyroscope, a microelectromechanical sensor gyroscope, a ring laser gyroscope, or a vibrating structure gyroscope).

The sensors 230A-1, 230A-2 . . . 230A-m or the sensors 230B-1, 230B-2 . . . 230B-n may further include one or more components or features for detecting and capturing sound energy in a vicinity of environments in which the aerial vehicles 210A, 210B are operating, or may be expected to operate. For example, the sensors 230A-1, 230A-2 . . . 230A-m or the sensors 230B-1, 230B-2 . . . 230B-n may include a microphone (e.g., any type or form of transducer such as a dynamic microphone, a condenser microphone, a ribbon microphone, or a crystal microphone that is configured to convert acoustic energy of any intensity and across any or all frequencies into one or more electrical signals, and may include any number of diaphragms, magnets, coils, plates, or other like features for detecting and recording such energy); a piezoelectric sensor configured to convert changes in pressure, including but not limited to such pressure changes that are initiated by the presence of acoustic energy across various bands of frequencies, to electrical signals, and may include one or more crystals, electrodes or other features; a vibration sensor or any other device configured to detect vibrations of one or more components of the aerial vehicles 210A, 210B (e.g., one or more piezoelectric device, accelerometers, an application-specific integrated circuit and one or more microelectromechanical sensors in a land grid array package, or the like, that are configured to sense differential accelerations along one or more axes over predetermined periods of time and to associate such accelerations with levels of vibration).

The sensors 230A-1, 230A-2 . . . 230A-m or the sensors 230B-1, 230B-2 . . . 230B-n may further include one or more components or features for detecting and capturing light energy in a vicinity of environments in which the aerial vehicles 210A, 210B are operating, or may be expected to operate. For example, the sensors 230A-1, 230A-2 . . . 230A-m or the sensors 230B-1, 230B-2 . . . 230B-n may include one or more imaging devices such as visual cameras (e.g., color, grayscale or black-and-white cameras), depth cameras (e.g., range cameras and/or depth sensors), infrared cameras, radiographic cameras or any other optical sensors. The sensors 230A-1, 230A-2 . . . 230A-m or the sensors 230B-1, 230B-2 . . . 230B-n may be configured to capture visual information or data (e.g., still or moving images in color or black and white that may be captured at any frame rates, or depth imaging data such as ranges), or associated audio information or data, or metadata, regarding objects or activities occurring within a vicinity of the aerial vehicles 210A, 210B, or for any other purpose, and to store information regarding the reflected light in one or more data files.

The sensors 230A-1, 230A-2 . . . 230A-m or the sensors 230B-1, 230B-2 . . . 230B-n may include one or more sensors for capturing information or data regarding environments surrounding the aerial vehicles 210A, 210B, including but not limited to a thermometer, a barometer, a hygrometer or an anemometer, e.g., any devices, components, systems, or instruments for determining local air temperatures, atmospheric pressures, humidities or wind speeds, respectively, within a vicinity of the aerial vehicle 210A, 210B. The sensors 230A-1, 230A-2 . . . 230A-m or the sensors 230B-1, 230B-2 . . . 230B-n may also include one or more sensors for determining a quality of air around the aerial vehicles 210A, 210B, such as one or more air monitoring sensors (e.g., oxygen, ozone, hydrogen, carbon monoxide, carbon dioxide or pH sensors, as well as sensors configured to detect one or more pathogens).

The sensors 230A-1, 230A-2 . . . 230A-m or the sensors 230B-1, 230B-2 . . . 230B-n may include one or more sensors for capturing information or data regarding one or more electromagnetic signals, waves, fields or other data, such as magnetic fields or electric fields.

In some embodiments, the sensors 230A-1, 230A-2 . . . 230A-m or the sensors 230B-1, 230B-2 . . . 230B-n may be equipped with one or more manual or automatic features for modifying their respective orientations. For example, a sensor may be mounted in a fixed position, or with a fixed angular orientation. Alternatively, a sensor may include one or more motorized features for adjusting a position of the sensor, or for adjusting the angular orientation (e.g., the roll angle, the pitch angle or the yaw angle) of the sensor, by causing a change in a location of the imaging device, or a change in one or more of the angles defining the angular orientation. In some embodiments, the sensors 230A-1, 230A-2 . . . 230A-m or the sensors 230B-1, 230B-2 . . . 230B-n may be configured to digitally or electronically process data captured thereby, subject to one or more physical or operational constraints. Moreover, in some embodiments, one or more of the aerial vehicles 210A, 210B may be configured to generally capture information or data within a vicinity thereof, or to determine a bearing, range and/or distance to a source of such information or data with respect to the aerial vehicles 210A, 210B.

As is discussed above, in some embodiments, the aerial vehicles 210A, 210B may each include one or more propulsion motors (e.g., electric, gasoline-powered or any other motor) joined to an airframe and capable of generating sufficient rotational speeds of corresponding propellers or other components to provide lift and/or thrust forces to the aerial vehicles 210A, 210B and any payload engaged thereby, such as to aerially transport the engaged payload from one location to another. For example, one or more of such propulsion motors may be a brushless direct current (DC) motor such as an outrunner brushless motor or an inrunner brushless motor. Additionally, the propulsion motors of the aerial vehicles 210A, 210B may be of any kind, and may be dedicated to one or more purposes or functions. For example, one or more of the propulsion motors may be aligned or configured to provide forces of lift to the aerial vehicles 210A, 210B, exclusively, while one or more of the propulsion motors may be aligned or configured to provide forces of thrust to the aerial vehicles 210A, 210B, exclusively. Alternatively, one or more of the propulsion motors may be aligned or configured to provide forces of lift and/or forces of thrust to the aerial vehicles 210A, 210B, as needed. For example, such propulsion motors may be fixed in their orientation on the aerial vehicles 210A, 210B, or configured to vary their respective orientations, e.g., a tilt-rotor aircraft. Moreover, such propulsion motors may be aligned or configured to operate with different capacities or ratings, or at different speeds, or coupled to propellers having different sizes and shapes. Such propulsion motors may be controlled by the processors 212A, 212B, the control systems 220A, 220B, or any other aspect of the aerial vehicles 210A, 210B.

Additionally, the propulsion motors of the aerial vehicles 210A, 210B may be coupled to one or more propellers, e.g., any rotors or rotatable systems having a plurality of shaped blades joined to a hub or boss. Each of such propellers may be rotatably mounted to a mast or shaft associated with a corresponding one of the propulsion motors and configured to generate forces of thrust when rotated within a fluid. Each of such propellers may also include any number of blades, and may be fixed pitch, adjustable pitch or variable pitch in nature. Moreover, one or more of the propellers may be banded or shielded in any manner. In some embodiments, one or more of the propellers may be configured to rotate about a vertical axis, and to provide forces of thrust in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of thrust in directions corresponding to such axes accordingly. Such propellers may be controlled by the processors 212A, 212B, the control systems 220A, 220B, or any other aspect of the aerial vehicles 210A, 210B.

The data processing system 270 includes one or more physical computer servers 272 having one or more computer processors 274 and any number of data stores 276 (e.g., databases) associated therewith, as well as provided for any specific or general purpose. For example, the data processing system 270 of FIG. 2 may be independently provided for the exclusive purpose of receiving, analyzing or storing information regarding positions, velocities (e.g., speeds or directions) or other information or data received from the aerial vehicles 210A, 210B or, alternatively, provided in connection with one or more other physical or virtual services configured to receive, analyze or store such information or data, as well as one or more other functions. The servers 272 may be connected to or otherwise communicate with the processors 274 and the data stores 276, which may store any type of information or data, for any purpose. The servers 272 and/or the computer processors 274 may also connect to or otherwise communicate with the network 280, as indicated by line 278, through the sending and receiving of digital data. For example, the data processing system 270 may include any facilities, stations or locations having the ability or capacity to receive and store information or data, such as media files, in one or more data stores, e.g., acoustic signals or energy, or related information or data received from the aerial vehicles 210A, 210B, or from one another, or from one or more other external computer systems (not shown) via the network 280. In some embodiments, the data processing system 270 may be provided in a physical location. In other such embodiments, the data processing system 270 may be provided in one or more alternate or virtual locations, e.g., in a "cloud"-based environment. In still other embodiments, one or more components of the data processing system 270 may be provided onboard one or more aerial vehicles, including but not limited to the aerial vehicles 210A, 210B.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some embodiments, the network 280 may be a private or semi-private network, such as a corporate or university intranet. The network 280 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicles 210A, 210B and/or the data processing system 270 may use any web-enabled or Internet applications or features, or any other client-server applications or features including E-mail or other messaging techniques, to connect to the network 280, or to communicate with one another, such as through short or multimedia messaging service (SMS or MMS) text messages. For example, the aerial vehicles 210A, 210B may be adapted to transmit information or data in the form of synchronous or asynchronous messages to the data processing system 270 or to any other computer device (e.g., to one or more other aerial vehicles) in real time or in near-real time, or in one or more offline processes, via the network 280. Those of ordinary skill in the pertinent art would recognize that the aerial vehicles 210A, 210B or the data processing system 270 may operate or be operated by any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processors 212A, 212B, the control systems 220A, 220B or the processor 274, or any other computers or control systems utilized by the aerial vehicles 210A, 210B or the data processing system 270 (e.g., by one or more other aerial vehicles), and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

As is discussed above, any type of device or system may capture data using one or more sensors and transmit some or all of such data, or a digital signature or other representation generated based on such data, to any other type of device or system. Likewise, any type of device or system may determine whether it is within a common locality with another device or system based on data or a digital signature or other representation received from the other device or system. The systems and methods of the present disclosure are not limited for use by devices or systems provided aboard or associated with aerial vehicles, or similar vehicles, and may instead be used by any type or form of computer device, e.g., mobile devices such as smartphones, tablet computers or the like.

Figure 3:
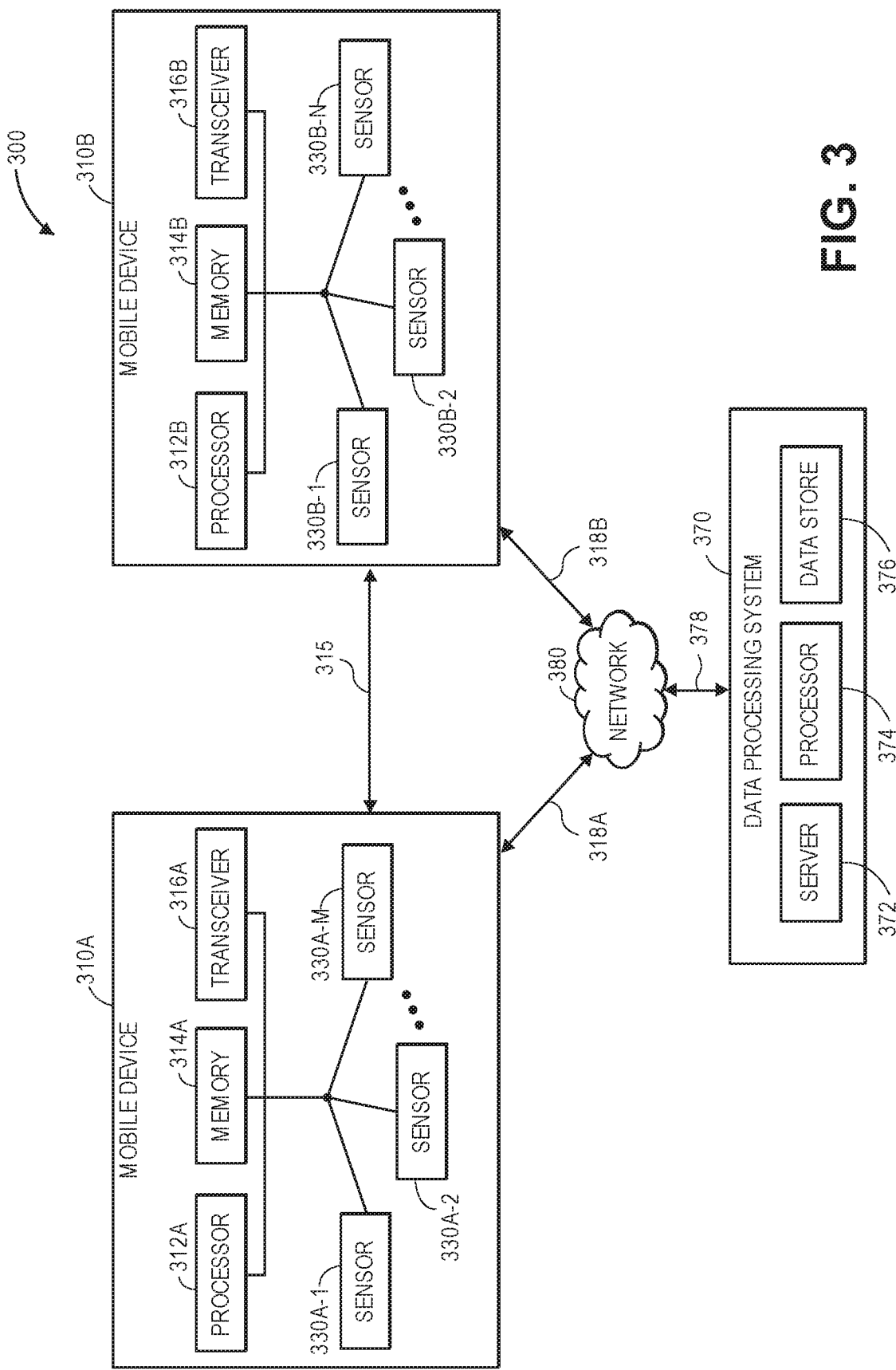
FIG. 3 is a block diagram of one system for determining relative positions or trusting data in accordance with embodiments of the present disclosure.

Referring to FIG. 3, a block diagram of one system 300 for determining relative positions or trusting data in accordance with embodiments of the present disclosure is shown. The system 300 of FIG. 3 includes a mobile device 310A, a mobile device 310B and a data processing system 370 that are connected to one another over a network 380, which may include the Internet, in whole or in part. Except where otherwise noted, reference numerals preceded by the number "3" shown in FIG. 3 indicate components or features that are similar to components or features having reference numerals preceded by the number "2" in FIG. 2 or by the number "1" shown in FIGS. 1A through 1J.

As is shown in FIG. 3, the mobile device 310A and the mobile device 310B are similarly configured. The mobile device 310A includes a processor 312A, a memory 314A and a transceiver 316A. The mobile device 310A further includes a control system 320A and a plurality of sensors 330A-1, 330A-2 . . . 330A-m. Likewise, the mobile device 310B includes a processor 312B, a memory 314B and a transceiver 316B. The mobile device 310B further includes a control system 320B and a plurality of sensors 330B-1, 330B-2 . . . 330B-n.

The mobile devices 310A, 310B may be any type or form of computer device such as a smartphone or a tablet computer that may be provided for one or more specific or general purposes. The processors 312A, 312B, the memory components 314A, 314B and the transceivers 316A, 316B may share any of the properties or attributes of the processors 212A, 212B of FIG. 2 described above. Additionally, any of the sensors 330A-1, 330A-2 . . . 330A-m or the sensors 330B-1, 330B-2 . . . 330B-n may share any of the properties or attributes of any of the sensors 230A-1, 230A-2 . . . 230A-m or the sensors 230B-1, 230B-2 . . . 230B-n of FIG. 2 described above. Additionally, the control systems 320A, 320B may control the operation of any aspect of the respective mobile devices 310A, 310B, including the operation of one or more of the sensors 330A-1, 330A-2 . . . 330A-m or the sensors 330B-1, 330B-2 . . . 330B-n, or any other components that may be associated with the mobile devices 310A, 310B, including not only components provided within a common housing or frame of the mobile devices 310A, 310B (e.g., cameras, microphones, audio controls, touchscreens, or others), as well as components with which the mobile devices 310A, 310B may be coupled using one or more wired or wireless systems or components.

Either of the respective mobile devices 310A, 310B may be configured to capture information or data by the sensors 330A-1, 330A-2 . . . 330A-m or the sensors 330B-1, 330B-2 . . . 330B-n, to transmit one or more messages including information or data, or digital signatures or other representations generated based on such information or data, to the other of the mobile devices 310A, 310B, and to determine whether the mobile devices 310A, 310B are within a common locality, or are not within a common locality. Alternatively, the mobile devices 310A, 310B may be configured to determine whether such devices are within a common locality, or are not within a common locality, with another sensor-equipped device.

Figure 4:
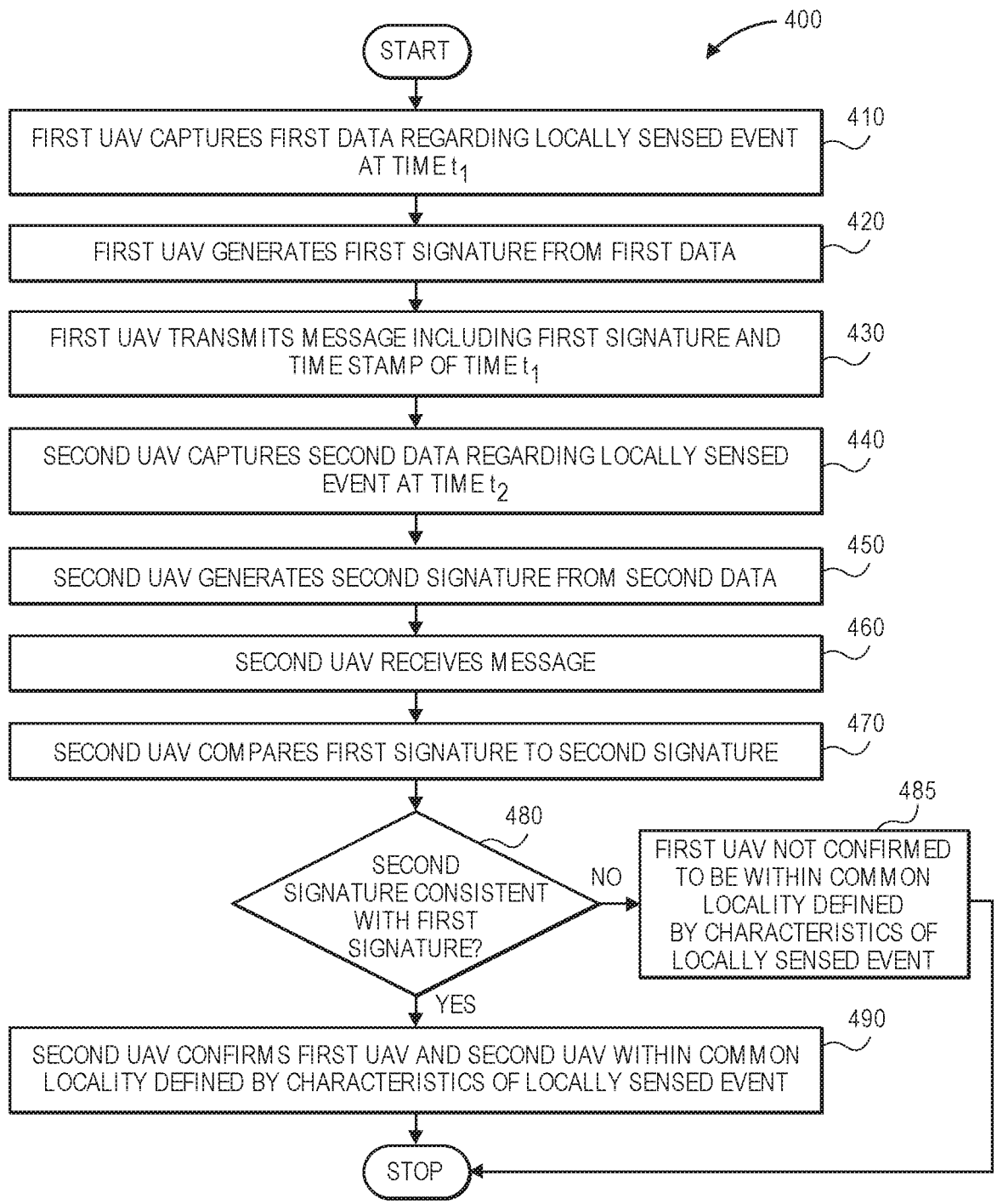
FIG. 4 is a flow chart of one process for determining relative positions or trusting data in accordance with embodiments of the present disclosure.

Referring to FIG. 4, a flow chart 400 of one process for determining relative positions or trusting data in accordance with embodiments of the present disclosure is shown. At box 410, a first unmanned aerial vehicle captures first data regarding a locally sensed event at a time $t_1$. The first data may be captured by any onboard sensors, and may include data regarding sounds, lights, or other matter or energy released during the locally sensed event, or during two or more locally sensed events. The first unmanned aerial vehicle may be configured to continuously capture information or data or, alternatively, to capture information or data in response to a triggering action or event. Alternatively, the first data may be captured by sensors provided aboard any other type or form of device or system, e.g., a mobile device. At box 420, the first unmanned aerial vehicle generates a first signature from the first data. For example, the first signature, or another representation of the first data, may include some or all of the first data, or may include one or more digits or characters that are selected or calculated based on the first data. At box 430, the first unmanned aerial vehicle transmits a message including the first signature and a time-stamp of time $t_1$. The message may be transmitted according to any protocol, and may be open and unencrypted, or subject to one or more forms or levels of encryption. The first signature may comprise any number of bits or bytes of the message, or may represent the first message in its entirety.

At box 440, a second unmanned aerial vehicle captures second data regarding the locally sensed event at a time $t_2$. In some embodiments, the second unmanned aerial vehicle may be equipped with the same complement of sensors as the first unmanned aerial vehicle. In some embodiments, the second unmanned aerial vehicle may be equipped with a different complement of sensors. Additionally, the second unmanned aerial vehicle may be configured to continuously capture information or data or, alternatively, to capture information or data in response to a triggering event, such as a receipt of the message transmitted at box 430.

At box 450, the second unmanned aerial vehicle generates a second signature from the second data. The second signature or other representation of the second data may be generated according to the same algorithms, formulas or techniques as the first signature, or according to one or more different algorithms, formulas or techniques. Additionally, the second signature may include some or all of the second data, or may include one or more digits or characters that are selected or calculated based on the second data.

At box 460, the second unmanned aerial vehicle receives the message transmitted by the first unmanned aerial vehicle at box 430, and at box 470, the second unmanned aerial vehicle compares the first signature included in the first message to the second signature generated at box 450. At box 480, the second unmanned aerial vehicle determines whether the second signature is consistent with the first signature. If the second signature is not consistent with the first signature, then the process advances to box 485, where the first unmanned aerial vehicle is not confirmed to be within a common locality defined by characteristics of the locally sensed event, and the process ends. In some embodiments, the second unmanned aerial vehicle may undertake any number of actions in response to determining that the second signature is not consistent with the first signature. For example, the second unmanned aerial vehicle may store or update one or more records or files, or transmit one or more messages, to indicate that communications subsequently received from the first unmanned aerial vehicle are not to be trusted. Alternatively, the second unmanned aerial vehicle may further attempt to determine whether the first unmanned aerial vehicle and the second unmanned aerial vehicle are located within a common locality that may be defined by any other techniques, e.g., based on any other signatures that may be included in the message received at box 460, other than the first signature, or based on any other messages that may be received by the second unmanned aerial vehicle at time $t_2$ or at any other time. The second unmanned aerial vehicle may further perform any other type or form of analysis on the message or the first signature, and may draw any relevant conclusion regarding a position of or distance to the first unmanned aerial vehicle, or the reliability of messages that may have been previously or subsequently received from the first unmanned aerial vehicle accordingly.

If the second signature is consistent with the first signature, however, then the process advances to box 490, where the second unmanned aerial vehicle confirms that the first unmanned aerial vehicle and the second unmanned aerial vehicle are within a common locality defined by one or more characteristics of a locally sensed event, or multiple locally sensed events, and the process ends. In some embodiments, any number of actions may be undertaken after the first unmanned aerial vehicle and the second unmanned aerial vehicle are determined to be within a common locality associated with such locally sensed events. For example, the second unmanned aerial vehicle may trust data included in the message transmitted by the first unmanned aerial vehicle at box 430, or included in other messages. Additionally, the second unmanned aerial vehicle may calculate a relative distance to the first unmanned aerial vehicle based on the first signature, the second signature, or any other information or data that may be known regarding the locally sensed event. Furthermore, the second unmanned aerial vehicle may generate and transmit a message including the second signature and the time-stamp of time $t_2$. If the first unmanned aerial vehicle receives the message, the first unmanned aerial vehicle may compare the second signature contained therein to the first signature that it generated at box 420, and may also confirm that the first unmanned aerial vehicle and the second unmanned aerial vehicle are within a common locality defined by one or more characteristics of a locally sensed event.

As is discussed above, devices or systems may be configured to capture data regarding any type or form of locally sensed event, and determine whether each other is within one or more localities defined by such locally sensed events based on such data, based on signatures generated from such data, or on other representations of such data.

Figure 5A:
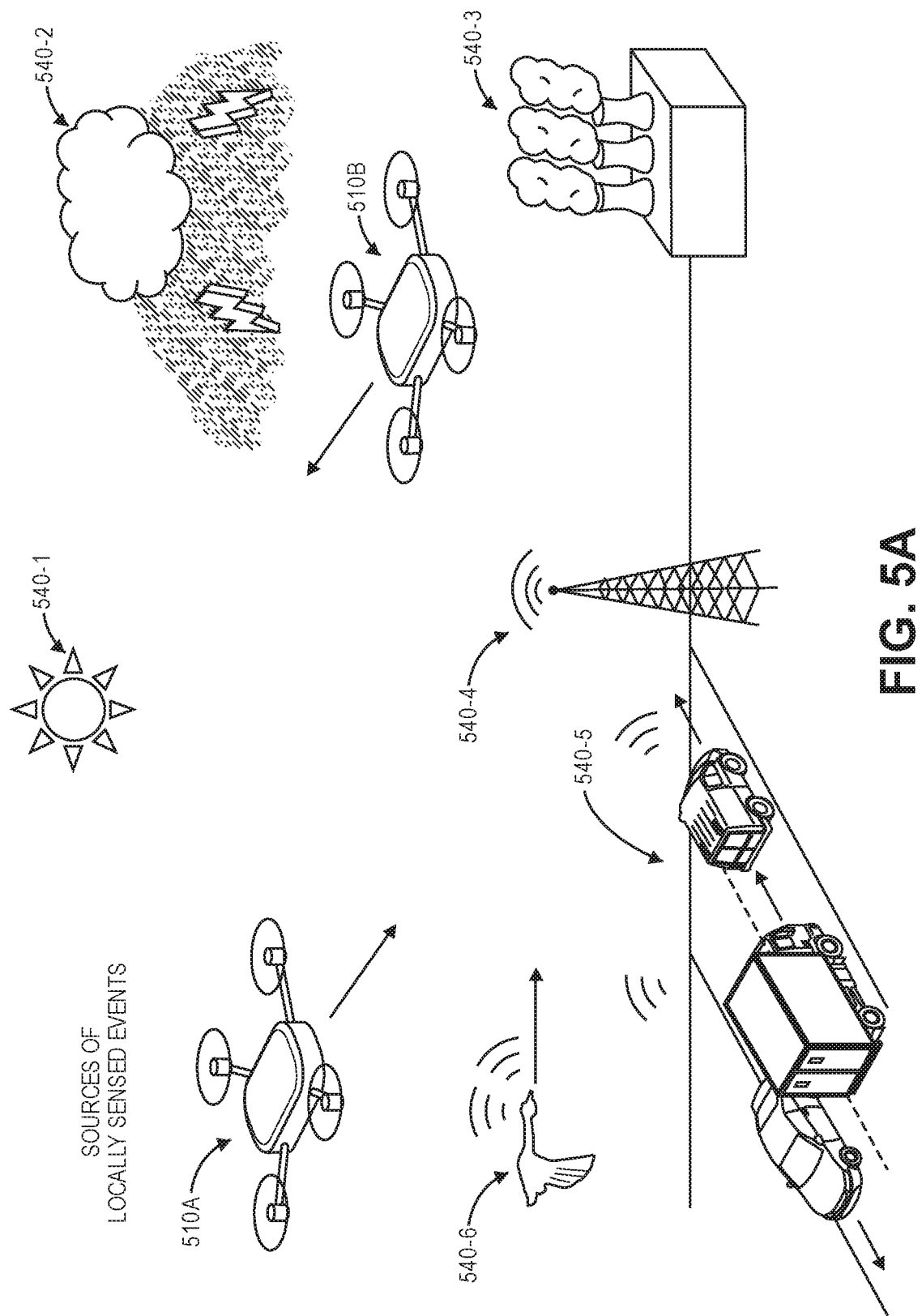
FIGS. 5A and 5B are views of aspects of one system for determining relative positions or trusting data in accordance with embodiments of the present disclosure.
Figure 5B:
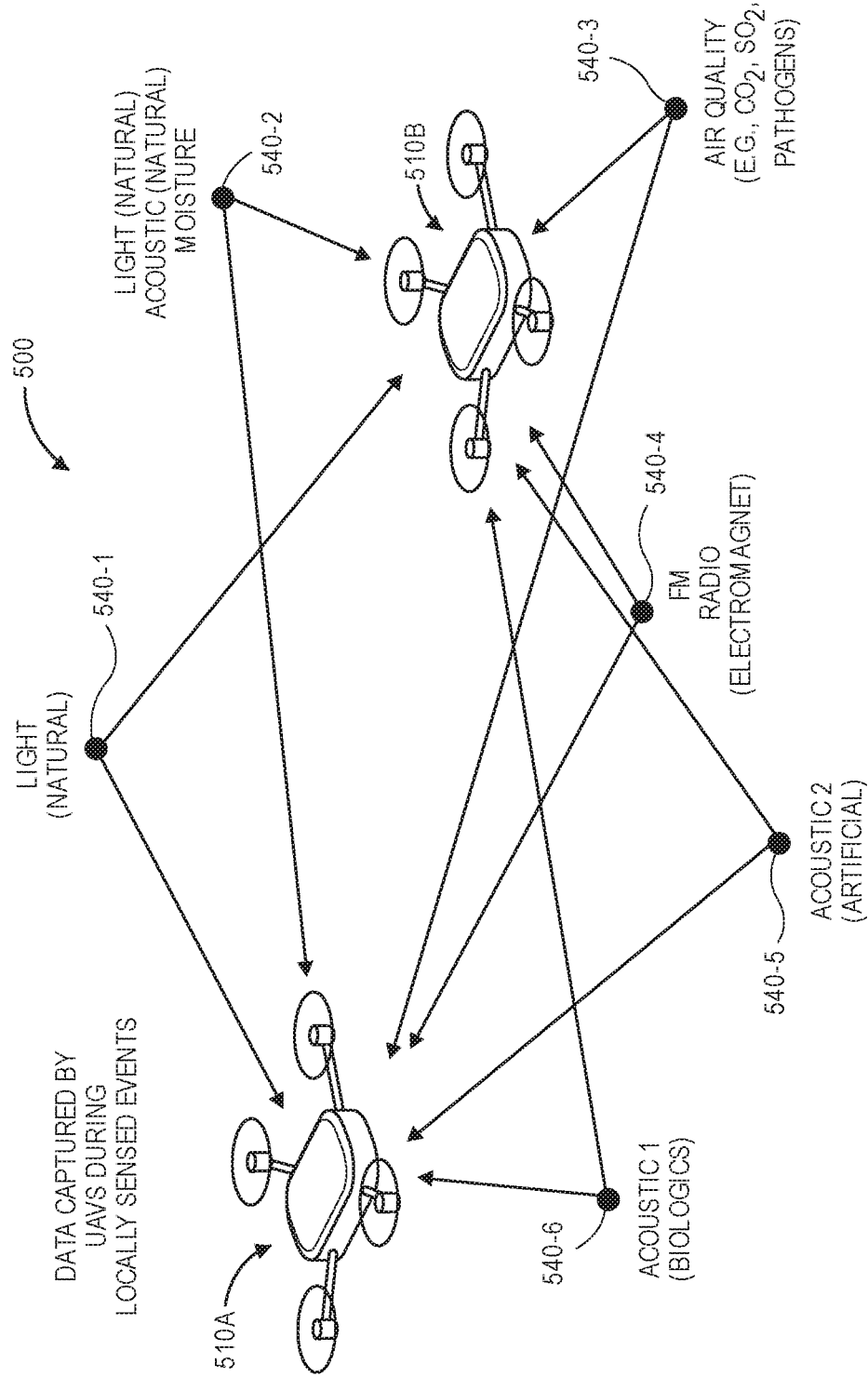

Referring to FIGS. 5A and 5B, views of aspects of one system for determining relative positions or trusting data in accordance with embodiments of the present disclosure are shown. Except where otherwise noted, reference numerals preceded by the number "5" shown in FIGS. 5A and 5B indicate components or features that are similar to components or features having reference numerals preceded by the number "3" shown in FIG. 3, by the number "2" shown in FIG. 2 or by the number "1" shown in FIGS. 1A through 1J.

As is shown in FIG. 5A, a pair of unmanned aerial vehicles 510A, 510B operate within ranges of a plurality of sources 540-1, 540-2, 540-3, 540-4, 540-5, 540-6 of locally sensed events. The source 540-1 is the Sun or, alternatively, another astrological light source such as the Earth's Moon, a planet, another moon, a star or a deep space object. The source 540-2 is a weather source, e.g., a thunderstorm, a lightning storm, a rain storm, a snow storm or any other weather event. The source 540-3 is an industrial source, e.g., a power plant, a factory, a construction site or the like. The source 540-4 is a telecommunications and/or broadcast antenna, e.g., a television antenna, an AM and/or FM radio antenna, a cellular telephone antenna, a shortwave radio antenna, a satellite dish, or the like. The source 540-5 is a transportation system, such as a highway having one or more vehicles operating thereon or, alternatively, an airport, a seaport, a railroad station, or the like. The source 540-6 is an animal, such as a bat, a bird, or the like.

As is shown in FIG. 5B, each of the aerial vehicles 510A, 510B may capture data regarding locally sensed events initiated at the respective sources 540-1, 540-2, 540-3, 540-4, 540-5, 540-6. For example, the aerial vehicles 510A, 510B may each feature one or more optical sensors (e.g., imaging devices) for capturing and interpreting data regarding light (e.g., sunlight) radiated upon the respective vehicles 510A, 510B by the source 540-1. Such data may include frequencies, wavelengths and/or intensities, as well as any other data. The aerial vehicles 510A, 510B, may be further configured to capture and interpret data regarding light (e.g., lightning) and/or sounds (e.g., thunder) emitted by the source 540-2, as well as air conditions (e.g., humidity) at or near the source 540-2. Such data may include frequencies, wavelengths and/or intensities of light, as well as frequencies and/or intensities (or sound pressure levels) of sounds, or percentages humidity, or any other data. The aerial vehicles 510A, 510B, may also be configured to capture and interpret data regarding air quality based on emissions by the source 540-3. For example, the aerial vehicles 510A, 510B may be configured with one or more sensors for detecting elements or molecules (e.g., oxygen, nitrogen, carbon dioxide), pollutants, pathogens, or any other substances, or for determining concentrations thereof.

The aerial vehicles 510A, 510B may be further configured to capture electromagnetic radiation, e.g., signals, waves, fields or other data of any intensity or within any frequency spectrum emitted by the source 540-4. The aerial vehicles 510A, 510B may also be configured to capture acoustic data emitted by any source, including but not limited to the artificial sounds generated by the source 540-5 or the biologic sounds generated by the source 540-6.

After the aerial vehicles 510A, 510B have captured data from one or more of the respective sources 540-1, 540-2, 540-3, 540-4, 540-5, 540-6, messages including such data or digital signatures generated from such data may be transmitted between the aerial vehicles 510A, 510B, which may then use such data to determine whether the aerial vehicles 510A, 510B are within a common locality. For example, light such as sunlight emitted by the source 540-1 may have different characteristics depending on a location of an observer. Therefore, if the frequencies, wavelengths and/or intensities of the light that are independently observed by sensors aboard the respective aerial vehicles 510A, 510B are determined to be similar to one another at the same time, or if angles such as elevation angles, altitude angles, zenith angles, azimuth angles, or any other angles to the source 540-1 are similar to one another at the same time, then the aerial vehicles 510A, 510B may be determined to be within a common locality defined by attributes of the emitted light at that time. Similarly, if the aerial vehicles 510A, 510B capture the sounds and/or light emitted by the source 540-2 during a weather event, and the characteristics of such sounds and light are similar to one another, the aerial vehicles 510A, 510B may be determined to be within a common locality defined by a visible range of lightning or an acoustic range of thunder, or in any other manner. Likewise, if humidity levels sensed by the aerial vehicles 510A, 510B are similar to one another, the aerial vehicles 510A, 510B may be determined to be within a common locality defined with respect to humidity.

If the aerial vehicles 510A, 510B each sense the same or similar concentrations of airborne elements, molecules, pollutants, pathogens or other substances, the aerial vehicles 510A, 510B may also be determined to be within a common locality defined with respect to the source 540-3. The concentrations sensed by each of the aerial vehicles 510A, 510B may be adjusted to account for elements detected within the vicinity of the aerial vehicles 510A, 510B, an elapsed time since an event that caused an emission of such substances, or any other factor. If the aerial vehicles 510A, 510B each capture electromagnetic signals from the source 540-4, then the aerial vehicles 510A, 510B may be determined to be within a common locality defined by a broadcast or transmission range of the source 540-4. The locality may be further limited or constrained by any additional facts that may be known regarding such electromagnetic signals. Finally, if the aerial vehicles 510A, 510B each capture data regarding artificial sounds (e.g., sounds of machinery, equipment, workers and/or transportation systems) emitted by the source 540-5 or biologic sounds (e.g., breathing, calls or other noises) emitted by the source 540-6, the aerial vehicles 510A, 510B may each be determined to be within acoustic ranges of the sources 540-5, 540-6, respectively. Moreover, data received from two or more of the sources 540-1, 540-2, 540-3, 540-4, 540-5, 540-6 may be further utilized to define one or more localities within which the aerial vehicles 510A, 510B are located, or to determine relative positions and/or distances of each of the aerial vehicles 510A, 510B.

Figure 6:
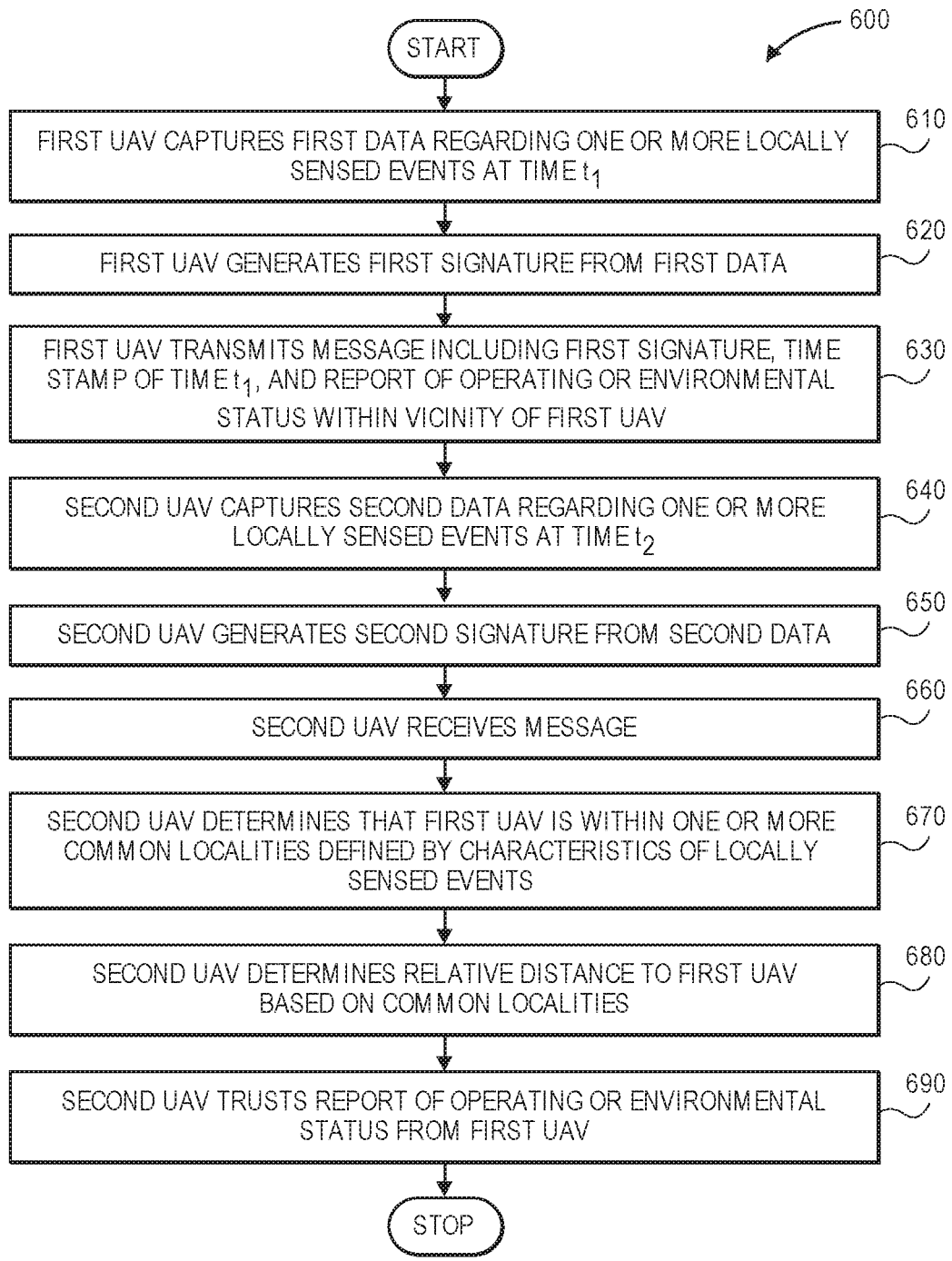
FIG. 6 is a flow chart of one process for determining relative positions or trusting data in accordance with embodiments of the present disclosure.

As is discussed above, some embodiments of the present disclosure may determine relative positions or distances of two or more devices or systems based on messages including data and/or signatures regarding a locally sensed event. Referring to FIG. 6, a flow chart 600 of one process for determining relative positions or trusting data in accordance with embodiments of the present disclosure is shown. At box 610, a first unmanned aerial vehicle captures first data regarding one or more locally sensed events at a time $t_1$, e.g., by any number of onboard sensors. The first data may include data regarding sounds, lights, or other matter or energy released during one or more locally sensed events and may be captured continuously or at any interval. Alternatively, the first data may be captured by sensors provided aboard any other type or form of device or system, e.g., a mobile device. At box 620, the first unmanned aerial vehicle generates a first signature from the first data. The first signature may include some or all of the first data, e.g., a spectrogram of the first data, or any number of digits or characters that are selected or calculated based on the first data. At box 630, the first unmanned aerial vehicle transmits a message including the first signature, a time-stamp of time $t_1$, and a report of an operating or environmental status within a vicinity of the first unmanned aerial vehicle. The message may be transmitted according to any protocol, and may be open and unencrypted, or subject to one or more forms or levels of encryption. Alternatively, the message may include any other type or form of information or data, in addition to the report of the operating or environmental status, or as an alternative to the report of the operating or environmental status, in accordance with the present disclosure.

At box 640, a second unmanned aerial vehicle captures second data regarding the locally sensed events at a time $t_2$, and at box 650, the second unmanned aerial vehicle generates a second signature from the second data. The second unmanned aerial vehicle may be configured to continuously capture information or data or, alternatively, to capture information or data in response to a triggering event, and the second signature may be generated according to the same algorithms, formulas or techniques as the first signature, or according to one or more different algorithms, formulas or techniques. For example, the second signature may include some or all of the second data, e.g., a spectrogram of the second data, or may include one or more digits or characters that are selected or calculated based on the second data.

At box 660, the second unmanned aerial vehicle receives the message transmitted by the first unmanned aerial vehicle at box 630. At box 670, the second unmanned aerial vehicle determines that the first unmanned aerial vehicle is within one or more common localities defined by characteristics of the locally sensed events. For example, where the locally sensed events include an acoustic event, an optical (e.g., light-based) event or an air quality event, the first signature may be compared against the second signature to determine whether the first unmanned aerial vehicle and the second unmanned aerial vehicle captured consistent acoustic data during the acoustic event, whether the optical characteristics (e.g., energies, frequencies or intensities observed) from the optical data captured by the sensors of the respective unmanned aerial vehicles following the optical event are consistent with one another, or whether the concentrations of elements, molecules or other substances within the air surrounding each of the unmanned aerial vehicles following the air quality event are consistent with one another.

In response to determining that the second unmanned aerial vehicle and the first unmanned aerial vehicle are within one or more common localities, the process advances to box 680, where the second unmanned aerial vehicle determines a relative distance to the first unmanned aerial vehicle based on the common localities. The relative distance between the second unmanned aerial vehicle and the first unmanned aerial vehicle, or a relative position of the first unmanned aerial vehicle, may be determined in any manner or on any basis. For example, the relative distance or the relative position may be determined based on differences between the times $t_1$, $t_2$, or based on any attributes of the first data or the second data, or the one or more locally sensed events that were responsible for emitting the matter or energy associated with the first data and the second data, accounting for any attenuation or differences between the first data and the second data based on operating or environmental conditions, or any other factor. At box 690, the second unmanned aerial vehicle trusts the report of the operating or environmental status received from the first unmanned aerial vehicle, and the process ends. Alternatively, the second unmanned aerial vehicle may generate and transmit a message including the second signature, thereby enabling the first unmanned aerial vehicle to determine that the first unmanned aerial vehicle and the second unmanned aerial vehicle are within one or more common localities defined by characteristics of the locally sensed events. Furthermore, the first unmanned aerial vehicle and/or the second unmanned aerial vehicle may continue to exchange messages including signatures generated from data captured thereby, to enable each of the respective unmanned aerial vehicles to track one another over time, to determine that the unmanned aerial vehicles remain within common localities, or to confirm that data exchanged between the unmanned aerial vehicles may be trusted.

Data captured by two or more devices or systems may be processed to determine whether such devices or systems are located within common localities, or to determine relative positions of such devices or systems. Relationships between such devices or systems may be further narrowed based on intersections of two or more localities in which the devices or systems are determined to be located. Referring to FIGS. 7A through 7G, views of aspects of one system for determining relative positions or trusting data in accordance with embodiments of the present disclosure are shown. Except where otherwise noted, reference numerals preceded by the number "7" shown in FIGS. 7A through 7G indicate components or features that are similar to components or features having reference numerals preceded by the number "5" shown in FIGS. 5A and 5B, by the number "3" shown in FIG. 3, by the number "2" shown in FIG. 2 or by the number "1" shown in FIGS. 1A through 1J.

As is shown in FIGS. 7A and 7B, a pair of unmanned aerial vehicles 710A, 710B operate within ranges of a pair of sources 740-1, 740-2 of locally sensed events. The source 740-1 is the Sun or, alternatively, another astrological light source. The source 740-2 is a telecommunications and/or broadcast antenna, e.g., an FM radio antenna.

Figure 7C:
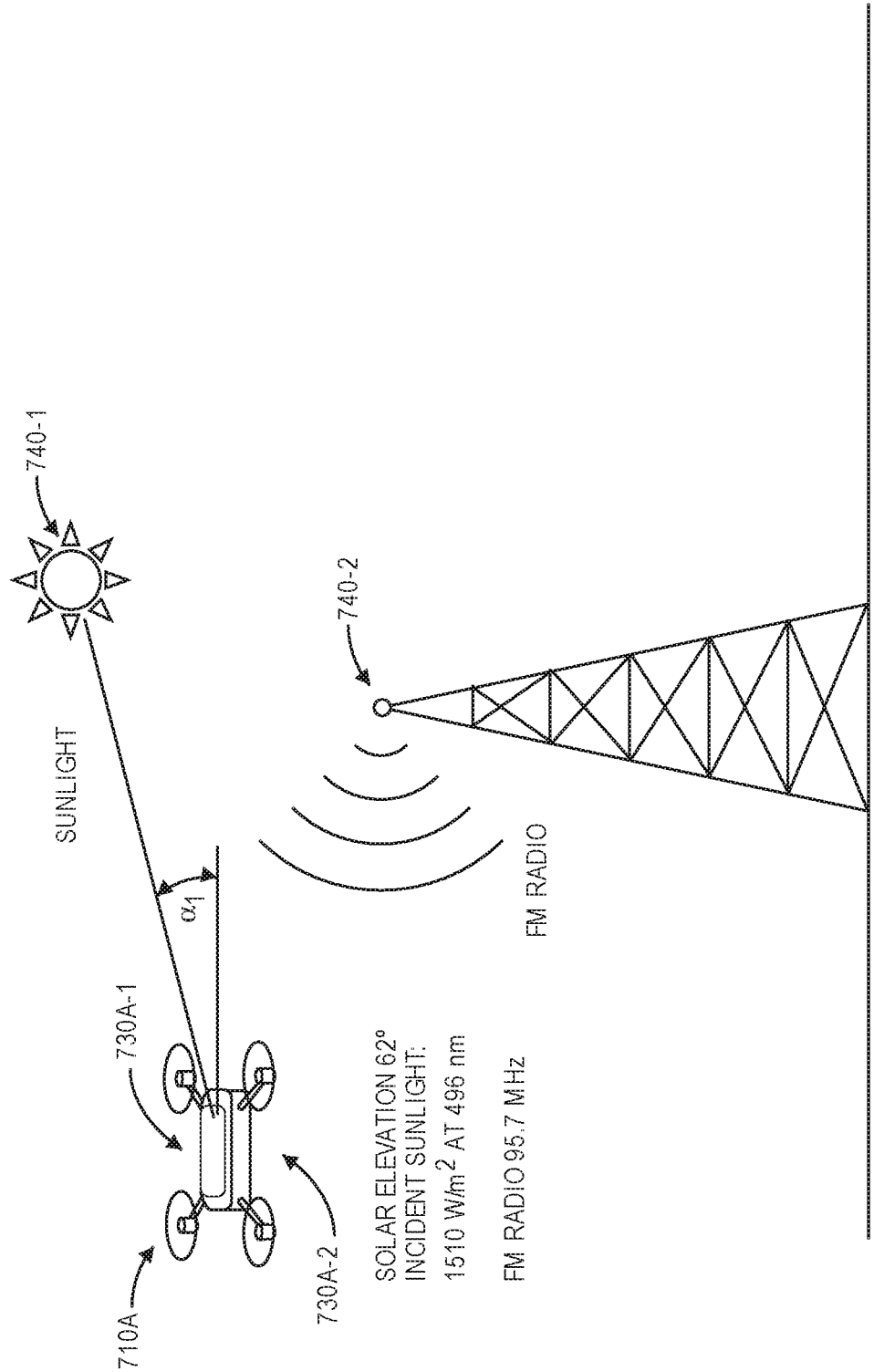

The aerial vehicles 710A, 710B may be configured to capture data during operations within ranges of the sources 740-1, 740-2. As is shown in FIG. 7C, the aerial vehicle 710A is equipped with a light sensor 730A-1 (e.g., an imaging device) and an electromagnetic sensor 730A-2. The light sensor 730A-1 may capture data regarding the light incident upon the aerial vehicle 710A during its operations. For example, the light sensor 730A-1 may be configured to capture incident light from one or more directions, and to determine frequencies, wavelengths and/or intensities of such light, as well as an angle $\alpha_1$ to the source 740-1 (viz., the Sun). In some embodiments, the light sensor 730A-1 and/or the aerial vehicle 710A may be configured to determine an elevation angle of the source 740-1, an azimuth to the source 740-1, or both an elevation angle of the source 740-1 and an azimuth of the source 740-1. For example, as is shown in FIG. 7C, the aerial vehicle 710A detects that the source 740-1 is located at a solar elevation of sixty-two degrees (62°), and that sunlight having a peak incidence of 1,510 watts per square meter (1,510 W/m$^2$) at a wavelength of four hundred ninety-six nanometers (496 nm, e.g., a shade of green). Concurrently, the electromagnetic sensor 730A-2 may capture electromagnetic signals (e.g., communications signals, or other signals) emitted by the source 740-2 or by any other source (not shown). For example, as is shown in FIG. 7C, the aerial vehicle 710A has captured an FM radio signal at a frequency of approximately 95.7 megahertz (95 MHz). In some embodiments, the electromagnetic sensor 730A-2 may be associated with one or more communications devices (e.g., an antenna or receiver).

Figure 7D:
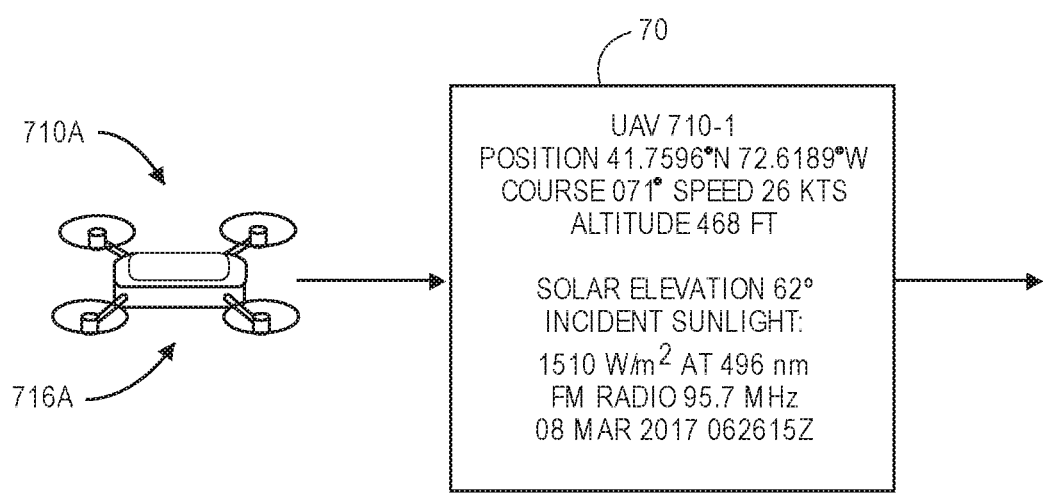

As is shown in FIG. 7D, the aerial vehicle 710A may generate and transmit a message 70 comprising at least some of the data captured by the sensors 730A-1, 730A-2. For example, the message 70 includes an identifier of the aerial vehicle 710A, a position of the aerial vehicle 710A, as well as a course, a speed, and an altitude of the aerial vehicle 710A. The message 70 further includes a summary of data captured by the light sensor 730A-1, e.g., the elevation angle $\alpha_1$ to the source 740-1, the peak incident solar energy on the aerial vehicle 710A and the wavelength of the incident solar energy. The message 70 also includes an indication that the electromagnetic sensor 730A-2 detected the FM radio signal having the frequency of 95.7 megahertz. The message 70 further includes a time-stamp (i.e., a date and time at which the incident light and the FM radio signal were captured).

Figure 7E:
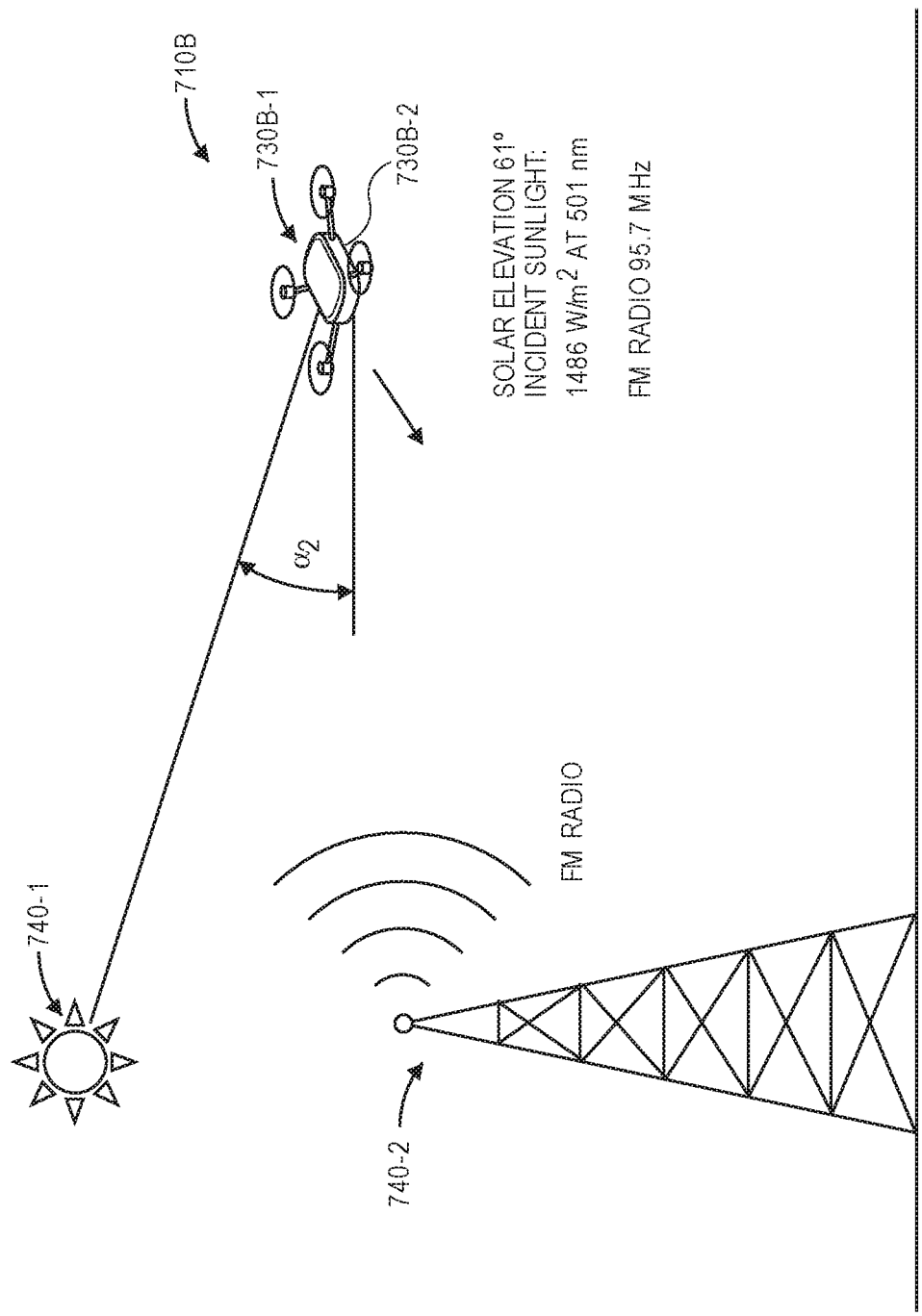

As is shown in FIG. 7E, the aerial vehicle 710B is likewise equipped with a light sensor 730B-1 and an electromagnetic sensor 730B-2. Like the light sensor 730A-1, the light sensor 730B-1 may capture data regarding light incident upon the aerial vehicle 710B during its operations, e.g., from one or more directions, and to determine frequencies, wavelengths and/or intensities of such light, as well as an angle $\alpha_2$ to the source 740-1. For example, as is shown in FIG. 7E, the aerial vehicle 710B detects that the source 740-1 is located at a solar elevation of sixty-one degrees (61°), and that sunlight having a peak incidence of 1,486 watts per square meter (1,486 W/m$^2$) at a wavelength of five hundred one nanometers (501 nm, e.g., a shade of green). The electromagnetic sensor 730B-2 may also capture electromagnetic signals emitted by the source 740-2 or by any other source (not shown). In some embodiments, the electromagnetic sensor 730B-2 may be associated with one or more communications devices (e.g., an antenna or receiver). For example, as is shown in FIG. 7E, the aerial vehicle 710B has captured an FM radio signal at a frequency of approximately 95.7 megahertz (95 MHz).

Figure 7F:
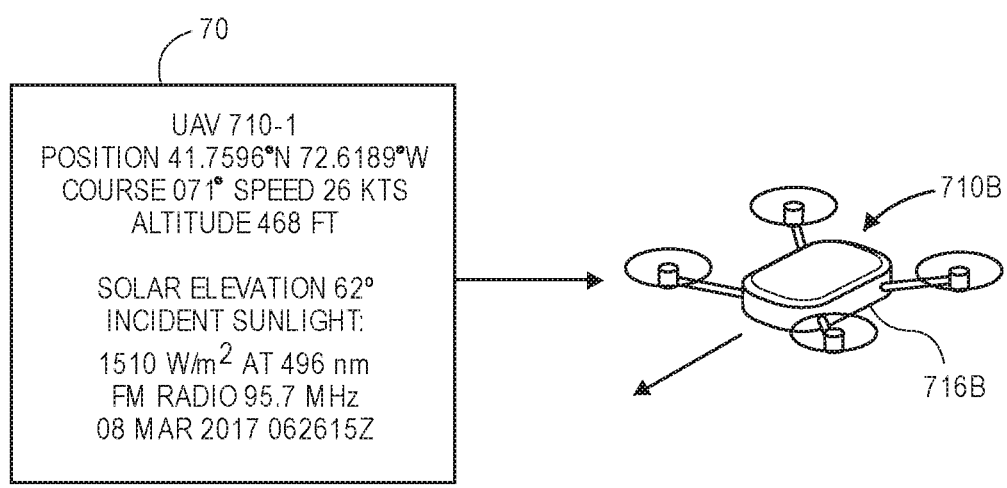
Figure 7G:
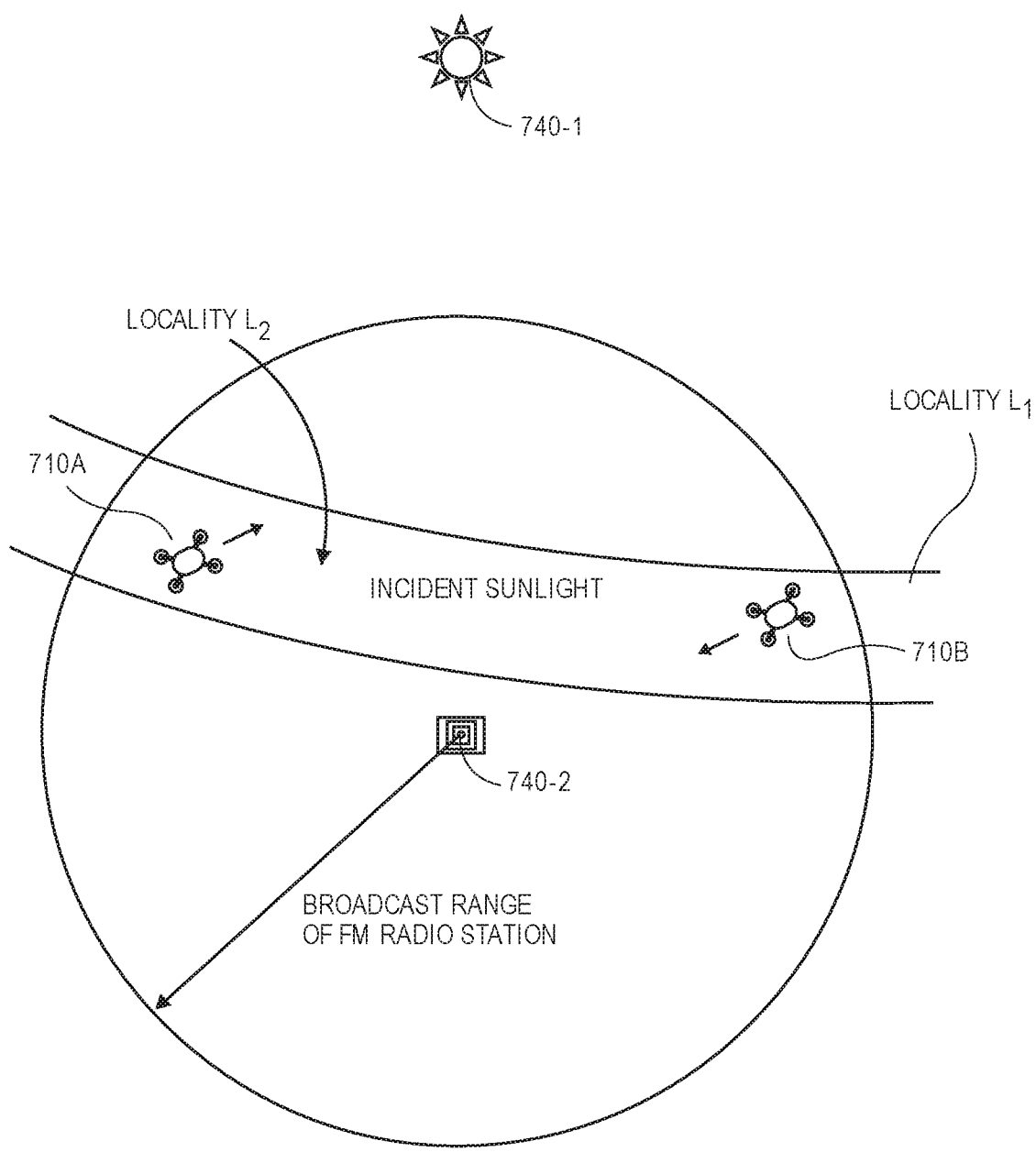

As is shown in FIG. 7F, the aerial vehicle 710B receives the message 70, including the summary of the data captured by the light sensor 730A-1 and the electromagnetic sensor 730A-2, from the aerial vehicle 710A. Based on data captured by the sensors 730B-1, 730B-2 regarding incident light and electromagnetic signals, and the data captured by the light sensor 730A-1 and the electromagnetic sensor 730A-2, the aerial vehicle 710B may determine that the aerial vehicle 710B and the aerial vehicle 710A are located within a common locality $L_1$ defined by the incident sunlight from the source 740-1, and a common locality $L_2$ defined by the broadcast range of the source 740-2. In particular, the aerial vehicle 710B may determine a location of the aerial vehicle 710A as being within an intersection of the two localities $L_1$, $L_2$. Moreover, the events resulting in the capture of data may have occurred concurrently, or at different times. The aerial vehicles 710A, 710B may continue to exchange any number of messages between one another over time, in order to track their respective positions, to confirm that the aerial vehicles 710A, 710B remain within the localities $L_1$, $L_2$, or other localities associated with the sources 740-1, 740-2 or other sources (not shown), or to confirm that data exchanged between the aerial vehicles 710A, 710B may be trusted.

Figure 8B:
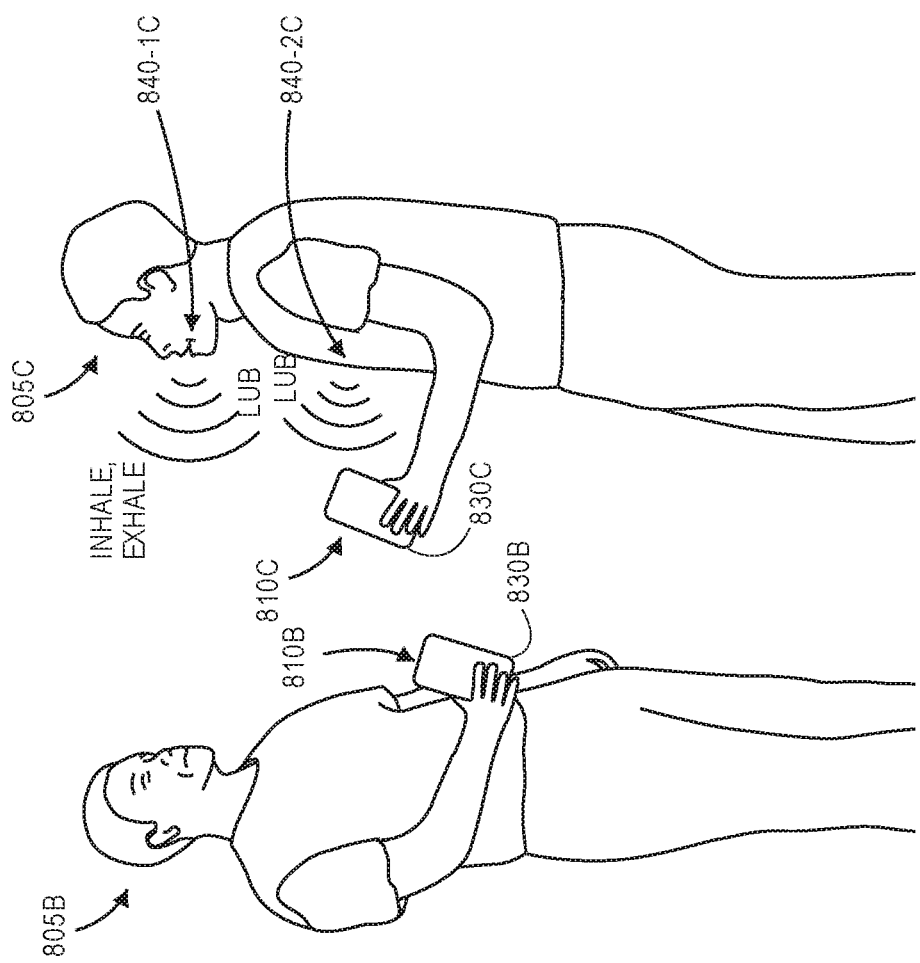
Figure 8B:
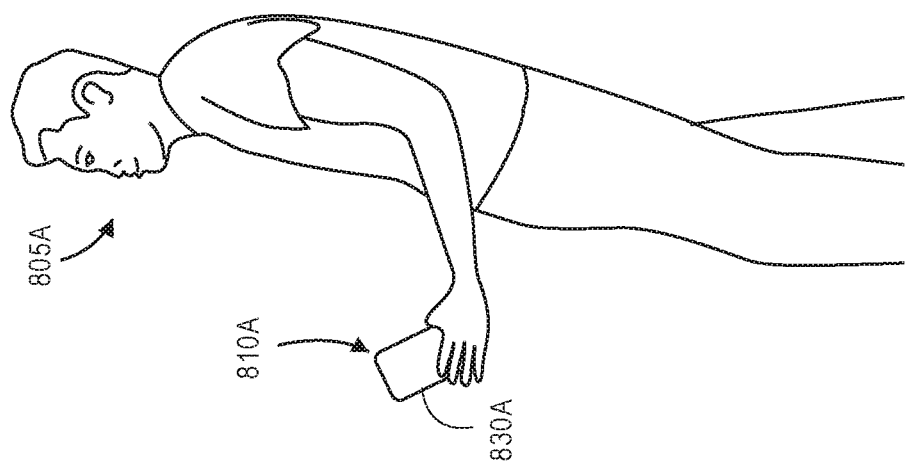
Figure 8C:
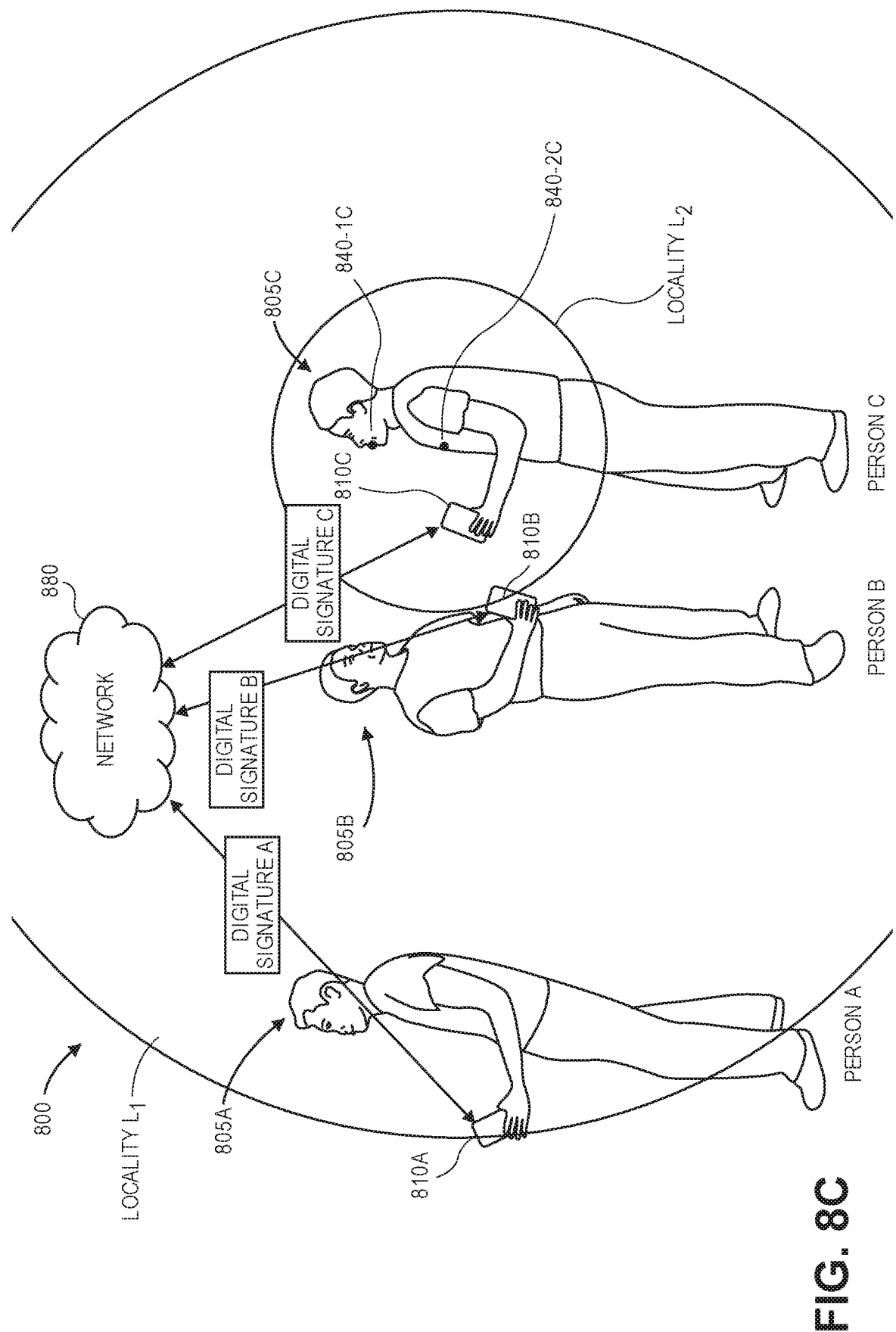

In some embodiments, one or more devices or systems may be configured to capture biometric data, e.g., information or data regarding various biologic events of a human or another animal, and to determine whether such devices or systems are within a predetermined range of the human or other animal or, alternatively, whether such devices or systems are not within the predetermined range of the human or other animal. Referring to FIGS. 8A through 8C, views of aspects of one system for determining relative positions or trusting data in accordance with embodiments of the present disclosure are shown. Except where otherwise noted, reference numerals preceded by the number "8" shown in FIGS. 8A through 8C indicate components or features that are similar to components or features having reference numerals preceded by the number "7" shown in FIGS. 7A through 7G, by the number "5" shown in FIGS. 5A and 5B, by the number "3" shown in FIG. 3, by the number "2" shown in FIG. 2 or by the number "1" shown in FIGS. 1A through 1J.

As is shown in FIG. 8A, a system 800 includes a plurality of persons 805A, 805B, 805C. Each of the persons 805A, 805B, 805C bears a mobile device 810A, 810B, 810C that is configured with one or more sensors 830A, 830B, 830C (e.g., acoustic sensors) and connected to a network 880, which may include the Internet, in whole or in part. Each of the sensors 830A, 830B, 830C may be configured to actively or passively gather information or data regarding environments in which the mobile devices 810A, 810B, 810C are respectively provided, including but not limited to biometric information or data regarding the persons 805A, 805B, 805C within such environments, or any other type or form of information or data regarding such environments.

As is shown in FIG. 8B, the mobile devices 810A, 810B, 810C may be configured to capture acoustic signals regarding respiratory and/or cardiac activity of one or more of the persons 805A, 805B, 805C. For example, where the person 805C breathes by way of his or her mouth 840-1C, or where a heart 840-2C of the person 805C beats, acoustic signals generated by the breathing or the beating may be captured by the respective sensors 830A, 830B, 830C of the mobile devices 810A, 810B, 810C, depending upon whether the mobile devices 810A, 810B, 810C are located within acoustic ranges of the mouth 840-1C or the heart 840-2C. Subsequently, the mobile devices 810A, 810B, 810C may determine various data regarding such signals, including but not limited to frequencies and/or sound pressure levels (or intensities) of such signals, and may generate a digital signature regarding the data captured thereby.

As is shown in FIG. 8C, each of the mobile devices 810A, 810B, 810C may transmit digital signatures generated by the respective devices based on the acoustic data captured by the respective sensors to a processing system (not shown) provided in one or more alternate or virtual locations, e.g., in a "cloud"-based environment, over the network 880. For example, the processing system may compare the digital signatures generated by the respective mobile devices 810A, 810B, 810C, and determine, based on such digital signatures, that the mobile devices 810A, 810B, 810C were within a first common locality $L_1$ defined with respect to the mouth 840-1C (e.g., an acoustic range of sounds associated with the breathing of the mouth 840-1C) of the person 805C. The processing system may further determine, based on such digital signatures, that the mobile devices 810B, 810C are within a second common locality $L_2$ defined with respect to the heart 840-2C (e.g., an acoustic range of sounds associated with the beating of the heart 840-2C) of the person 805C, and that the mobile device 810A was not located within the second common locality $L_2$. For example, where the digital signatures generated by the mobile devices 810A, 810B, 810C indicate that acoustic signals captured thereby represented a breathing pattern of the person 805C, the mobile devices 810A, 810B, 810C and the persons 805A, 805B may be determined to have each been located within the acoustic range of the mouth 840-1C of the person 805C when data from which the digital signatures were generated was captured. Conversely, where the digital signatures generated by the mobile devices 810B, 810C indicate that acoustic signals captured thereby represent the heartbeat of the person 805C, and that the digital signature generated by the mobile device 810A does not indicate that acoustic signals captured thereby represent the heartbeat of the person 805C, the persons 805B, 805C may be determined to have been located within the acoustic range of the heart 840-2C, and the person 805A may be determined to have been located outside of the acoustic range of the heart 840-2C when the data from which the digital signatures were generated was captured.

In some embodiments, the processing system (not shown) may store or update one or more files or records regarding the relative locations of the persons 805A, 805B, 805C or the relative distances therebetween. For example, the processing system may store or update one or more files or records to indicate that the persons 805A, 805B, 805C were located within the locality $L_1$ at the time that the data from which the digital signatures were generated was captured, and also that the persons 805B, 805C were located within the locality $L_2$ at that time, but that the person 805A was not located within the locality $L_2$ at that time. In some embodiments, the processing system may also transmit one or more messages to the mobile devices 810A, 810B, 810C indicating the relative locations of the persons 805A, 805B, 805C and/or relative positions between the persons 805A, 805B, 805C.

Figure 9A:
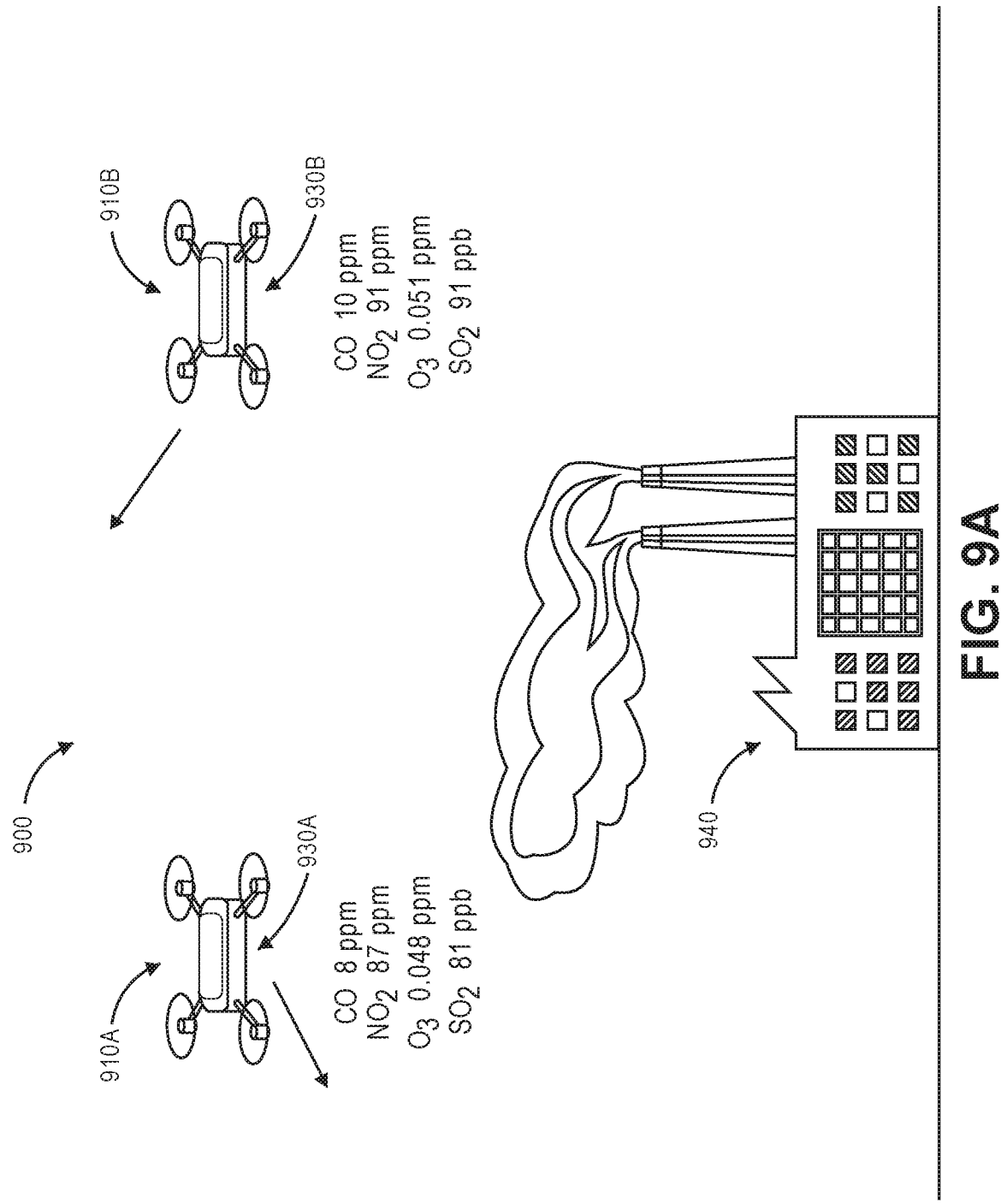

As is also discussed above, the systems and methods of the present disclosure may also determine that two or more devices or systems are located within a common locality defined based on atmospheric quality, e.g., contents of air that may be sampled and/or analyzed by one or more sensors provided aboard such devices or systems. Referring to FIGS. 9A and 9B, views of aspects of one system for determining relative positions or trusting data in accordance with embodiments of the present disclosure are shown. Except where otherwise noted, reference numerals preceded by the number "9" shown in FIGS. 9A and 9B indicate components or features that are similar to components or features having reference numerals preceded by the number "8" shown in FIGS. 8A through 8C, by the number "7" shown in FIGS. 7A through 7G, by the number "5" shown in FIGS. 5A and 5B, by the number "3" shown in FIG. 3, by the number "2" shown in FIG. 2 or by the number "1" shown in FIGS. 1A through 1J.

As is shown in FIG. 9A, the system 900 includes a pair of aerial vehicles 910A, 910B flying within a vicinity of a source 940 of one or more atmospheric components (e.g., pollutants, or any type or form of particulate matter, gases, vapors or other substances). Each of the aerial vehicles 910A, 910B is equipped with one or more sensors 930A, 930B that may sample air surrounding the aerial vehicles 910A, 910B for one or more elements, molecules, or other substances. For example, as is shown in FIG. 9A, the sensor 930A determines that air surrounding the aerial vehicle 910A has concentrations of eight parts per million (8 ppm) carbon monoxide (CO), eighty-seven parts per million (87 ppm) nitrogen dioxide ($NO_2$), forty-eight one-thousandths parts per million (0.048 ppm) ozone ($O_3$) and eighty-one parts per billion (81 ppb) sulfur dioxide ($SO_2$). The sensor 930B determines that air surrounding the aerial vehicle 910B has concentrations of ten parts per million (10 ppm) carbon monoxide (CO), ninety-one parts per million (91 ppm) nitrogen dioxide ($NO_2$), fifty-one one-thousandths parts per million (0.051 ppm) ozone (03) and ninety-one parts per billion (91 ppb) sulfur dioxide ($SO_2$).

In accordance with the present disclosure, two or more devices or systems may be determined to be within a common locality where data captured by sensors associated with such devices or systems, or digital signatures or other representations that are generated based on such data, are consistent with one another. As is shown in FIG. 9B, the aerial vehicle 910A generates and transmits a message 90 comprising a digital signature generated based on the concentrations of carbon monoxide, nitrogen dioxide, ozone and sulfur dioxide sensed by the sensor 930A. Upon receiving the message 90, the aerial vehicle 910B may determine that the digital signature included in the message 90 is consistent with the concentrations of carbon monoxide, nitrogen dioxide, ozone and sulfur dioxide sensed by the sensor 930B and, therefore, that the aerial vehicle 910A that transmitted the message 90 is located within a common locality $L_1$ with the aerial vehicle 910B. The locality $L_1$ may be defined with respect to a location of the source 940, or the respective concentrations determined by the sensors 930A, 930B. In some embodiments, in response to receiving the message 90, or upon confirming that the aerial vehicle 910A and the aerial vehicle 910B are within the common locality $L_1$, the aerial vehicle 910B may generate and transmit a message (not shown) to the aerial vehicle 910A that includes a digital signature or other representation of the concentrations sensed by the sensor 930B, thereby further confirming to the aerial vehicle 910A that another aerial vehicle (viz., the aerial vehicle 910B) received the message 90, and enabling the aerial vehicle 910A to confirm that it and the aerial vehicle 910B are within a common locality. Each of the aerial vehicles 910A, 910B may sense concentrations using the sensors 930A, 930B at any number of times, or generate and transmit any number of messages including signatures or other representations of such concentrations, in accordance with the present disclosure.

Moreover, the concentrations sensed using the sensors 930A, 930B may be further analyzed to predict a relative distance between the aerial vehicles 910A, 910B, along with any other relevant intrinsic or extrinsic factors. For example, an aerial vehicle that detects higher concentrations of the respective elements or molecules may be presumed to be located nearer to the source 940, or downwind of the source 940, than an aerial vehicle that has detected lower concentrations of the respective elements or molecules, which may be presumed to be located farther from the source 940, or upwind of the source 940. The values of the respective concentrations may also be considered in determining a distance from the source 940, either independently or in concert with one another.

Furthermore, in some implementations, the sensors 930A, 930B may sample the air surrounding the respective aerial vehicles 910A, 910B for one or more elements, molecules, or other substances at different times, and may generate and transmit one or more messages containing digital signatures or other representations of data regarding the air quality at such different times to confirm that the aerial vehicles 910A, 910B remain within one or more common localities, or to determine positions or relative distances between them. For example, referring again to FIG. 9B, after transmitting the message 90, the aerial vehicle 910A may continue to generate and transmit messages including signatures or other representations based on the concentrations of carbon monoxide, nitrogen dioxide, ozone and sulfur dioxide sensed by the sensor 930A at later times. The aerial vehicle 910B may interpret such messages to determine whether the aerial vehicle 910A remains within a common locality with the aerial vehicle 910B, to increase a level of confidence or accuracy in a position of the aerial vehicle 910A determined based on such concentrations, to track the aerial vehicle 910A over time (e.g., by dead reckoning) based on changes in such concentrations, or to confirm that data received from the aerial vehicle 910A may be trusted where such concentrations are consistent with concentrations sensed by the sensor 930B. For example, where the aerial vehicle 910B determines a position of the aerial vehicle 910A at a first time, and a position of the aerial vehicle 910A at a second time, based on messages received from the aerial vehicle 910A, the aerial vehicle 910B may determine or generate a vector corresponding to a course and a speed of the aerial vehicle 910A over time, subject to any factors relating to accuracy and/or tolerances of the messages or the concentrations, and may track the aerial vehicle 910A accordingly.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, one or more of the embodiments of the present disclosure may be utilized as a primary system or method for determining relative positions or distances between two or more devices or systems, or determining whether data exchanged between two or more devices or systems may be trusted. Alternatively, one or more of such embodiments may be used in concert with other systems or methods, e.g., as a secondary or backup system or method, for determining relative positions or distances between such devices or systems, or for determining whether data exchanged between such devices or systems may be trusted.

Additionally, one or more of the embodiments may be utilized to determine whether two or more devices or systems are located within a common locality in real time, or in near-real time, e.g., at a present time. Alternatively, one or more of the embodiments may be utilized to forensically, or historically, determine whether two or more devices or systems were located within a common locality at a prior time. For example, data captured by the two or more devices or systems with respect to one or more locally sensed events may be subsequently evaluated to determine whether or how long such devices or systems were located within a common locality.

Moreover, although one or more of the embodiments disclosed herein may reference determining whether devices or systems are located within a common locality, or relative positions or distances between such devices or systems, based on types or categories of matter or energy emitted during events, e.g., light, sound, electromagnetic radiation or airborne concentrations of particulates, pathogens or pollutants, the systems and methods are not so limited. Any data that may be sensed regarding any matter or energy of any type or form that is emitted or released during one or more events may be captured and processed to determine whether two or more devices or systems are located within a common locality, or to determine relative positions or distances between such devices or systems, in accordance with the present disclosure.

One or more embodiments of the systems and methods of the present disclosure may be utilized in environments where two or more devices or systems are in motion, or where one or more devices or systems is fixed in location, and where one or more devices or systems is in motion. Likewise, the systems and methods of the present disclosure may also be utilized in environments where sources of matter or energy are fixed or in motion. Each of the devices or systems disclosed herein may be outfitted with one or more transmitting and/or receiving components, and relative positions or distances may be determined based on data captured by such components. Additionally, the systems and methods of the present disclosure may operate based on times and time-stamps determined according to any global clock, or by any global time standard.

Although some of the embodiments disclosed herein may reference the use of mobile devices or unmanned aerial vehicles, e.g., for delivering payloads from warehouses or other like facilities to customers or other recipients, those of ordinary skill in the pertinent arts will recognize that the systems and methods disclosed herein are not so limited, and may be utilized in connection with any type or form of device, system, vehicle, station or other object in general, including any type or form of aerial vehicle (e.g., manned or unmanned) having fixed or rotating wings for any intended industrial, commercial, recreational or other use, as well as any other type or form of land-based, sea-based or air-based vehicle, station or object. Furthermore, the systems and methods may be used between homogenous sets of systems or devices (e.g., by exchanging messages and/or data between two or more aerial vehicles, or between two or more mobile devices) or heterogeneous sets of systems or devices (e.g., by exchanging messages and/or data between any number of systems or devices of any type).

It should be understood that, unless otherwise explicitly or implicitly indicated herein, any of the features, capacities, attributes, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 4 or 6, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A method comprising:
   capturing, by at least a first sensor of a first system at a first time, first data regarding at least one event, the first data including at least one first attribute associated with the at least one event;
   receiving, by a first transceiver of the first system, a first message transmitted by a second transceiver of a second system, wherein the first message is generated by at least a second processor of the second system based at least in part on second data captured by at least a second sensor of the second system at a second time, the second data including at least one second attribute associated with the at least one event;
   determining, by at least a first processor of the first system, whether at least some of the first data is consistent with at least some of the second data based at least in part on the first message;
   in response to determining that the at least some of the first data is consistent with the at least some of the second data:
      determining, by at least the first processor, that the second data is associated with the at least one event;
      determining, by at least the first processor, that the first system and the second system were within at least one common locality at one of the first time or the second time; and
      determining, by at least the first processor, that data received from the second system is trusted; and
   determining, by at least the first processor, a distance between the first system and the second system based at least in part on the at least one first attribute, the at least one second attribute, and a difference between the first time and the second time,
   wherein the at least one event is associated with an emission of at least one of a light, an acoustic signal, an electromagnetic signal, at least one particle, at least one gas or at least one vapor.

2. The method of claim 1, wherein determining that the at least some of the first data is consistent with the at least some of the second data comprises:
   determining, by at least the first processor, that at least some of the second data was captured during the at least one event.

3. The method of claim 1, wherein the first data comprises at least one of:
   a first frequency of the acoustic signal;
   a first sound pressure level of the acoustic signal;
   a first bearing to a source of the acoustic signal;
   a first frequency or a first wavelength of the light incident upon at least a portion of the first system;
   a first intensity of the light incident upon at least the portion of the first system;
   a first bearing to a source of the light a first frequency of the electromagnetic signal;
   a first bearing to the electromagnetic signal; or
   a first concentration of the at least one particle, the at least one gas or the at least one vapor,
   wherein the second data comprises at least one of:
   a second frequency of the acoustic signal;
   a second sound pressure level of the acoustic signal;
   a second bearing to a source of the acoustic signal;
   a second frequency or a second wavelength of the light incident upon at least a portion of the second system;
   a second intensity of the light incident upon at least the portion of the second system;
   a second bearing to a source of the light a second frequency of the electromagnetic signal;
   a second bearing to the electromagnetic signal; or
   a second concentration of the at least one particle, the at least one gas or the at least one vapor, and
   wherein determining that the at least some of the first data is consistent with the at least some of the second data comprises:
   comparing at least one of:
      the first frequency of the acoustic signal, the first sound pressure level of the acoustic signal, the first bearing to a source of the acoustic signal, the first frequency or the first wavelength of the light incident upon at least a portion of the first system, the first intensity of the light incident upon at least the portion of the first system, the first bearing to a source of the light, the first frequency of the electromagnetic signal, the first bearing to the electromagnetic signal, or the first concentration of the particle, the at least one gas or the at least one vapor, to at least one of:

the second frequency of the acoustic signal, the second sound pressure level of the acoustic signal, the second bearing to a source of the acoustic signal, the second frequency or the second wavelength of the light incident upon at least a portion of the second system, the second intensity of the light incident upon at least the portion of the second system, the second bearing to a source of the light, the second frequency of the electromagnetic signal, the second bearing to the electromagnetic signal, or the second concentration of the at least one particle, the at least one gas or the at least one vapor.

4. The method of claim 1, further comprising:

establishing, by at least the first processor, at least one parameter of the at least one common locality based at least in part on the first data or the second data.

5. The method of claim 1, wherein the first data comprises data regarding a first event and data regarding a second event, wherein the first event comprises a first emission of one of a first light, a first acoustic signal, a first electromagnetic signal, a first particle, a first gas or a first vapor, wherein the second event comprises a second emission of one of a second light, a second acoustic signal, a second electromagnetic signal, a second particle, a second gas or a second vapor, and wherein determining that the at least some of the first data is consistent with the at least some of the second data comprises:

determining, by at least the first processor, that at least one of the data regarding the first event or the data regarding the second event is consistent with the at least some of the second data.

6. The method of claim 5, further comprising:

establishing, by at least the first processor, at least one parameter of a first locality based at least in part on the data regarding the first event; and establishing, by at least the first processor, at least one parameter of a second locality based at least in part on the data regarding the second event, wherein determining that the first system and the second system were within at least one common locality comprises:

determining, by at least the first processor, that the second system is within one of the first locality or the second locality at the second time based at least in part on the second data.

7. The method of claim 1, wherein the first message comprises a digital representation of the second data generated by at least the second processor of the second system, and wherein determining that the at least some of the first data is consistent with the at least some of the second data comprises:

determining that at least some of the first data is consistent with the digital representation of the second data.

8. The method of claim 1, further comprising:

generating, by at least the first processor, a second message based at least in part on the first data;

transmitting, by the first transceiver, the second message;

determining, by at least the second processor, that at least some of the first data is consistent with at least some of the second data based at least in part on the second message;

in response to determining that the at least some of the first data is consistent with the at least some of the second data, determining, by at least the second processor, that the first data is associated with the at least one event; and in response to determining that the first data is associated with the at least one event, determining, by at least the second processor, that the first system and the second system were within the at least one common locality at one of the first time or the second time; and determining, by at least the second processor, that data received from the first system is trusted.

9. The method of claim 1, wherein the at least one event further comprises the emission of light from a natural or artificial source, wherein the first data comprises at least one of a first frequency, a first wavelength or a first intensity of light captured by the first sensor, wherein the second data comprises at least one of a second frequency, a second wavelength or a second intensity of light captured by the second sensor, and wherein determining that the at least some of the first data is consistent with the at least some of the second data comprises:

determining that the at least one of the first frequency, the first wavelength or the first intensity is consistent with the at least one of the second frequency, the second wavelength or the second intensity.

10. The method of claim 1, wherein the at least one event further comprises the emission of an acoustic energy from a natural or artificial source, wherein the first data comprises at least one of a first frequency, a first wavelength or a first intensity of acoustic energy captured by the first sensor, wherein the second data comprises at least one of a second frequency, a second wavelength or a second intensity of acoustic energy captured by the second sensor, and wherein determining that the at least some of the first data is consistent with the at least some of the second data comprises:

determining that the at least one of the first frequency, the first wavelength or the first intensity is consistent with the at least one of the second frequency, the second wavelength or the second intensity.

11. The method of claim 1, wherein the at least one event comprises an emission of one of oxygen, nitrogen, carbon dioxide, ozone, sulfur dioxide, water or at least one pathogen by a natural or artificial source, wherein the first data comprises at least one of a first amount or a first concentration of the one of oxygen, nitrogen, carbon dioxide, ozone, sulfur dioxide, water or at least one pathogen captured by the first sensor, wherein the second data comprises at least one of a second amount or a second concentration of the one of oxygen, nitrogen, carbon dioxide, ozone, sulfur dioxide, water or at least one pathogen captured by the second sensor, wherein determining whether the first data is consistent with the at least some of the first message comprises:

determining that the at least one of the first amount or the first concentration is consistent with the at least one of the second amount or the second concentration.

12. The method of claim 1, wherein the first system is at least a portion of a first aerial vehicle, and
wherein the second system is at least a portion of a second aerial vehicle.

13. The method of claim 1, further comprising:
in response to determining that at least some of the first data is not consistent with at least some of the second data, at least one of:
determining, by at least the first processor, that the second data is not associated with the at least one event;
determining, by at least the first processor, that the first system and the second system are not within the at least one common locality at the one of the first time or the second time; or
determining, by at least the first processor, that data received from the second system is not trusted.

14. An aerial vehicle, comprising:
a first sensor;
a first transceiver; and
a control system, comprising:
one or more processors; and
a memory coupled to the one or more processors and storing program instructions that when executed by the one or more processors cause the one or more processors to at least:
capture, by at least the first sensor at a first time, first data regarding at least one event, the first data including at least one first attribute associated with the at least one event;
receive, by the first transceiver, a first message transmitted by a second transceiver of a second system, wherein the first message is generated by at least a second processor of the second system based at least in part on second data captured by at least a second sensor of the second system at a second time, the second data including at least one second attribute associated with the at least one event;
determine whether at least some of the first data is consistent with at least some of the second data based at least in part on the first message;
in response to a determination that the at least some of the first data is consistent with the at least some of the second data:
determine that the second data is associated with the at least one event;
determine that the aerial vehicle and the second system were within at least one common locality at one of the first time or the second time; and
determine that data received from the second system is trusted; and
determine a distance between the aerial vehicle and the second system based at least in part on the at least one first attribute, the at least one second attribute, and a difference between the first time and the second time,
wherein the at least one event is associated with an emission of at least one of a light, an acoustic signal, an electromagnetic signal, at least one particle, at least one gas or at least one vapor.

15. The aerial vehicle of claim 14, wherein a determination that the at least some of the first data is consistent with the at least some of the second data includes determining that at least some of the second data was captured during the at least one event.

16. The aerial vehicle of claim 14, wherein the first data comprises data regarding a first event and data regarding a second event,
wherein the first event comprises a first emission of one of a first light, a first acoustic signal, a first electromagnetic signal, a first particle, a first gas or a first vapor,
wherein the second event comprises a second emission of one of a second light, a second acoustic signal, a second electromagnetic signal, a second particle, a second gas or a second vapor, and
wherein a determination that the at least some of the first data is consistent with the at least some of the second data includes determining that at least one of the data regarding the first event or the data regarding the second event is consistent with the at least some of the second data.

17. The aerial vehicle of claim 14, wherein the program instructions further cause the one or more processors to at least:
in response to a determination that at least some of the first data is not consistent with at least some of the second data, at least one of:
determine that the second data is not associated with the at least one event;
determine that the aerial vehicle and the second system are not within the at least one common locality at the one of the first time or the second time; or
determine that data received from the second system is not trusted.

18. A system, comprising:
a first sensor;
a first transceiver;
one or more processors; and
a memory coupled to the one or more processors and storing program instructions that when executed by the one or more processors cause the one or more processors to at least:
capture, by at least the first sensor at a first time, first data regarding at least one event, the first data including at least one first attribute associated with the at least one event;
receive, by the first transceiver, a first message transmitted by a second transceiver of a second system, wherein the first message is generated by at least a second processor of the second system based at least in part on second data captured by at least a second sensor of the second system at a second time, the second data including at least one second attribute associated with the at least one event;
determine whether at least some of the first data is consistent with at least some of the second data based at least in part on the first message;
in response to a determination that the at least some of the first data is consistent with the at least some of the second data:
determine that the second data is associated with the at least one event;
determine that the system and the second system were within at least one common locality at one of the first time or the second time; and
determine that data received from the second system is trusted; and determine a distance between the system and the second system based at least in part on the at least one first attribute, the at least one second attribute, and a difference between the first time and the second time,
wherein the at least one event is associated with an emission of at least one of a light, an acoustic signal, an electromagnetic signal, at least one particle, at least one gas or at least one vapor.

19. The system of claim 18, wherein the program instructions further cause the one or more processors to at least:
generate a second message based at least in part on the first data;
transmit, by the first transceiver, the second message;
determine, by at least the second processor, that at least some of the first data is consistent with at least some of the second data based at least in part on the second message;
in response to a determination that the at least some of the first data is consistent with the at least some of the second data:
determine, by at least the second processor, that the first data is associated with the at least one event; and
in response to determining that the first data is associated with the at least one event,
determine, by at least the second processor, that the system and the second system were within the at least one common locality at one of the first time or the second time; and
determine, by at least the second processor, that data received from the system is trusted.

20. The system of claim 18, wherein the first message comprises a digital representation of the second data generated by at least the second processor of the second system, and
wherein a determination that the at least some of the first data is consistent with the at least some of the second data includes determining that at least some of the first data is consistent with the digital representation of the second data.

* * * * *